US012626992B2

(12) United States Patent (10) Patent No.: US 12,626,992 B2
Casey (45) Date of Patent: May 12, 2026

(54) BATTERY STORAGE CONTAINER AND METHOD OF USE

(71) Applicant: DRAGON Q ENERGY LLC, Santa Barbara, CA (US)

(72) Inventor: Daniel P. Casey, Santa Barbara, CA (US)

(73) Assignee: DRAGON Q ENERGY LLC, Santa Barbara, CA (US)

( * ) Notice: Subject to any disclaimer, the term of this patent is extended or adjusted under 35 U.S.C. 154(b) by 0 days.

(21) Appl. No.: 19/353,477

(22) Filed: Oct. 8, 2025

(65) Prior Publication Data

US 2026/0038943 A1     Feb. 5, 2026

Related U.S. Application Data

(63) Continuation of application No. 19/122,043, filed as application No. PCT/US2023/076604 on Oct. 11, 2023.

(Continued)

(51) Int. Cl.
*H01M 50/258*     (2021.01)
*H01G 11/82*      (2013.01)
(Continued)

(52) U.S. Cl.
CPC .......... *H01M 50/258* (2021.01); *H01G 11/82* (2013.01); *H01M 10/052* (2013.01);
(Continued)

(58) Field of Classification Search
None
See application file for complete search history.

(56) References Cited

U.S. PATENT DOCUMENTS 9,184,451 B2     11/2015  Bennett et al.
10,608,254 B2    3/2020   Rustomji
(Continued)

FOREIGN PATENT DOCUMENTS

CN        111403633 A      7/2020
JP        2019133884 A  *  8/2019   ............. B63B 32/10
(Continued)

OTHER PUBLICATIONS

Machine Translation of JP-2019133884-A (Year: 2019).*
(Continued)

*Primary Examiner* — Gregg Cantelmo
(74) *Attorney, Agent, or Firm* — Todd Ostomel

(57)          ABSTRACT

The present disclosure relates to a battery energy storage container. The energy storage container has a cylindrical housing and a pair of end caps disposed on opposite ends of the cylindrical housing. A diaphragm is positioned between each end cap selected from the pair of end caps and the corresponding end of the cylindrical housing. In one version, the energy storage container is configured to be installed below the ground surface for geological thermal management of the energy storage container. Embodiments of the present invention further disclose various types of electrode retainers. The energy storage container is configured for use in electrochemical battery cells, Li-ion batteries, intercalation batteries, metal-air batteries, flow batteries, fuel cells, reversible fuel cells, and capacitors.

7 Claims, 15 Drawing Sheets

Related U.S. Application Data

(60) Provisional application No. 63/417,286, filed on Oct. 18, 2022.

(51) Int. Cl.

| | |
|---|---|
| *H01M 10/052* | (2010.01) |
| *H01M 10/0525* | (2010.01) |
| *H01M 10/054* | (2010.01) |
| *H01M 12/02* | (2006.01) |
| *H01M 12/06* | (2006.01) |
| *H01M 50/204* | (2021.01) |
| *H01M 50/213* | (2021.01) |
| *H01M 50/30* | (2021.01) |
| *H01M 50/375* | (2021.01) |
| *H01M 8/08* | (2016.01) |
| *H01M 8/10* | (2016.01) |
| *H01M 8/18* | (2006.01) |
| *H01M 8/24* | (2016.01) |
| *H01M 8/2465* | (2016.01) |
| *H01M 8/249* | (2016.01) |

(52) U.S. Cl.
CPC ..... *H01M 10/0525* (2013.01); *H01M 10/054* (2013.01); *H01M 50/204* (2021.01); *H01M 50/213* (2021.01); *H01M 50/30* (2021.01); *H01M 50/375* (2021.01); *H01M 8/08* (2013.01); *H01M 8/10* (2013.01); *H01M 8/18* (2013.01); *H01M 8/24* (2013.01); *H01M 8/2465* (2013.01); *H01M 8/249* (2013.01); *H01M 12/02* (2013.01); *H01M 12/06* (2013.01)

(56) References Cited

U.S. PATENT DOCUMENTS

| | | | |
|---|---|---|---|
| 10,608,284 B2 | 3/2020 | Rustomji | |
| 2002/0034087 A1 | 3/2002 | Suzuki | |
| 2005/0287422 A1 | 12/2005 | Kim | |
| 2008/0076016 A1 | 3/2008 | Ghosh et al. | |
| 2009/0294195 A1 | 12/2009 | Otsuka | |
| 2011/0076521 A1 | 3/2011 | Shimizu | |
| 2011/0203674 A1 | 8/2011 | Fetner | |
| 2015/0107824 A1 | 4/2015 | Signorelli et al. | |
| 2017/0288286 A1* | 10/2017 | Buckhout | H01M 50/519 |
| 2018/0069251 A1* | 3/2018 | Dean | H01M 8/249 |
| 2020/0185681 A1 | 6/2020 | Erhart | |
| 2020/0274118 A1 | 8/2020 | Fees et al. | |
| 2022/0115726 A1* | 4/2022 | Biermann | H01M 50/293 |
| 2023/0144687 A1 | 5/2023 | Kusu et al. | |

FOREIGN PATENT DOCUMENTS

| | | | | |
|---|---|---|---|---|
| JP | 2019192352 A | * | 10/2019 | |
| WO | WO 2009042494 A2 | | 4/2009 | |
| WO | WO-2015075460 A1 | * | 5/2015 | H01M 50/213 |
| WO | WO 2021157740 A1 | | 8/2021 | |
| WO | WO 2023080600 A1 | | 5/2023 | |
| WO | WO 2024102338 A1 | | 5/2024 | |

OTHER PUBLICATIONS

Machine Translation of JP-2019192352-A (Year: 2019).*

Written Opinion and International Search Report of the patent PCT Application No. PCT/US2023/036880, dated on Feb. 29, 2024.

Written Opinion and International Search Report of the patent PCT Application No. PCT/US2023/76604, Opinion date of mailing Jun. 26, 2024.

International Preliminary Report on Patentability, PCT Application No. PCT/US2023/76604, Opinion date of mailing Jun. 10, 2025.

* cited by examiner

BATTERY STORAGE CONTAINER AND METHOD OF USE

CROSS-REFERENCE TO RELATED APPLICATIONS

This Application is a Continuation of U.S. patent application Ser. No. 19/122,043, filed Apr. 17, 2025, which is a National Phase Application filed under 35 U.S.C. § 371 of PCT Application No. PCT/US2023/076604, titled, "Battery Energy Storage Container and Method of Use," filed Oct. 11, 2023, which claims priority to and benefit of U.S. Provisional Patent Application No. 63/417,286, entitled "Pressurized Energy Storage Container and Method of Use," to Casey, filed on Oct. 18, 2022.

FIELD OF THE DISCLOSURE

The present invention relates to the field of energy storage and more particularly, the present invention relates to energy storage containers for use in batteries, capacitors, and fuel cells.

BACKGROUND OF THE INVENTION

There is an interrelated problem of climate change and increased populations/power consumption of crowded urban and suburban areas, and the negative effects on the power grid. Overloading the grid on hot summer days, results in a massive sag of the power line conductor until such a critical point that the conductor could ground and arc with trees, structures, and even terrain. The infamous 2003 Northeast power outage and the 2017 Thomas Forest Fire in California resulted in untold environmental damage, loss of life, loss of service and incredible personal and corporate financial losses. In regular circumstances, like on a hot day with a high electrical load, the ISO (Independent Service Operator) actively monitors sag levels, and preemptively shuts down service, to prevent arcing, outages, and fires. Also, with the aging grid, powerlines under reasonable/high loads will arc across insulators to the powerline support structure. At best, the ISO experiences massive power losses, and at worst, a total failure of the insulator or conductor resulting in an outage or fire. Even in 2005, it could be estimated that electrification of transportation and grid, with a shift away from hydrocarbon fuels, was a challenging path for the national grid. A method to manufacture large, safe, and low cost battery cells can make a meaningful impact on further electrifying the grid with renewable electrical generation and will reduce peak load and mitigate fossil fuel electrical generation Current battery improvements focus on the chemistry to increase energy density, cycles, safety and other figures of merit in an 18650/4680 cell, pouch, or prismatic cells. However, very little research is being conducted on container innovations. Currently, small-format battery solutions are being adopted to solve large-scale, long-duration energy storage problems. These are not good uses for the requirements of large-format, long-duration, energy storage systems.

Since 2005, an intense global paradigm shift (namely Al Gore's Inconvenient Truth and The Paris Agreement of 2015) to electrify everything and decarbonize the grid requires long-duration energy storage solutions for the market.

U.S. Pat. No. 10,608,284 discloses a compressed-gas electrolyte as a liquefied gas electrolyte. However, the technology disclosed does not offer an accompanying hardware solution to reduce their invention to practice.

The existing BESS (Battery Energy Storge Systems) solutions related to long-duration energy storage are ineffective, complex in use, difficult to manufacture, costly, and have specific safety concerns involving thermal runaway and fires. There is a need for an effective and efficient solution that solves the aforementioned problem of long-duration energy storage using small-format, fit for mobility, cells. energy storage containers.

SUMMARY

The present invention provides a battery energy storage container comprising: a cylindrical housing configured for enclosing electrodes and storing electrolyte at pressure above ambient pressure or below ambient pressure; wherein the cylindrical housing comprises two opposite ends spaced from each other; a pair of end caps disposed on opposite ends of the cylindrical housing, wherein the pair of end caps are configured to seal the opposite ends of the cylindrical housing; wherein each end cap selected from the pair of end caps comprises a pressure relief valve; and a diaphragm positioned between each end cap selected from the pair of end caps and the corresponding end of the cylindrical housing.

In an embodiment, each end cap selected from the pair of end caps comprises a flange; and each end selected from the two opposite ends of the cylindrical housing comprises an opposite flange.

In an embodiment, each end cap selected from the pair of end caps comprises a pressure port that is configured to introduce fluid or gases in the corresponding end cap.

In an embodiment, the energy storage container is configured to be installed below the ground surface for geological thermal management of the energy storage container.

In an embodiment, the energy storage container is configured for use in electrochemical, Li-ion, intercalation, metal-air batteries, flow batteries, fuel cells, reversible fuel cells, and capacitors.

In an embodiment, each end cap selected from the pair of end caps is fixedly connected to the corresponding end of the cylindrical housing.

In an embodiment, each end cap selected from the pair of end caps comprises a pressure relief valve, and the set pressure of the pressure relief valve of each end cap selected from the pair of end caps is measurably distinct from one another.

In an embodiment, each end cap selected from the pair of end caps comprises a pressure relief valve, and the set pressure of the pressure relief valve of each end cap selected from the pair of end caps is measurably same.

Embodiments of the present invention further discloses an over-pressure fail-safe mechanism for a container comprising: a pressure relief valve arranged in the container; an envelope connected downstream to the pressure relief valve; wherein the envelope is configured to be filled with contents of the container; wherein the over-pressure fail-safe mechanism is configured to be automatically activated in either a first mode or a second mode depending on the pressure of the contents in the container; wherein in the first mode, the pressure relief valve releases at least some contents of the container in the envelope; wherein in the subsequent second mode, the envelope releases a metered quantity of at least some contents of the container in the atmosphere; and wherein the second mode is activated only after activation of the first mode when the pressure of the released contents in the envelope exceeds a third set pressure.

In an embodiment, the over-pressure fail-safe mechanism is automatically activated only when the pressure of the contents in the container exceeds a second set pressure.

In an embodiment, the envelope further comprises a pressure relief valve that is configured to release a metered quantity of at least some contents of the container in the atmosphere when the pressure of the released contents in the envelope exceeds a third set pressure.

Embodiments of the present invention further discloses an electrode retainer comprising: an internal slip fit retainer element can be sealed or comprising a plurality of corrugation holes to allow electrolyte circulation; an external slip fit retainer element comprising a plurality of corrugation holes to allow electrolyte circulation; and an internal cavity is defined between the internal slip fit retainer element and the external slip fit retainer element to support the installation of at least one electrode.

In an embodiment, at least one electrode separator is arranged between at least a pair of electrodes.

In an embodiment, at least a pair of electrodes is selected from the group comprising of: jelly-roll (commercially available cylindrical cells), perpendicular thin-film electrodes (pouch or prismatic), wafer electrodes, and disk-shaped electrodes.

In an embodiment, the electrodes selected from at least a pair of electrodes are arranged parallel to each other.

Embodiments of the present invention further disclose an electrode retainer comprising: a plurality of tubes arranged substantially parallel to each other; wherein the plurality of tubes are spaced from each other; a cathode arranged in at least one tube selected from the plurality of tubes; an anode arranged in at least one tube selected from the plurality of tubes; and at least one fluid flow arranged in a space formed between the plurality of tubes; wherein the fluid comprises at least one of: a coolant and/or an electrolyte.

In an embodiment, the plurality of tubes are interconnected to form a substantially cylindrical shape.

In an embodiment, the cathode and/or anode are formed of a shape comprising of: A square tube, a cylindrical rod, a hexagonal shaft, a rectangle pipe, and an oval pipe.

Embodiments of the present invention further discloses an battery energy storage container comprising: a cylindrical housing configured for enclosing electrodes and storing electrolyte at pressure above or below ambient pressure; wherein the cylindrical housing comprises two opposite ends spaced from each other; a pair of end caps disposed on opposite ends of the cylindrical housing, wherein the pair of end caps are configured to seal the opposite ends of the cylindrical housing; wherein each end cap selected from the pair of end caps comprises a pressure relief valve; a diaphragm positioned between each end cap selected from the pair of end caps and the corresponding end of the cylindrical housing; and wherein the energy storage container is configured to be installed below the ground surface for geological thermal management of the energy storage container.

In an embodiment, each end cap selected from the pair of end caps comprises a flange; and each end selected from the two opposite ends of the cylindrical housing comprises an opposite flange.

In an embodiment, each end cap selected from the pair of end caps comprises a pressure port that is configured to introduce fluid or gases in the corresponding end cap.

In an embodiment, the energy storage container is configured to be installed below the ground surface for geological thermal management of the energy storage container.

In an embodiment, the energy storage container is configured for use in metal-air batteries, flow batteries, fuel cells, reversible fuel cells, and capacitors.

In an embodiment, each end cap selected from the pair of end caps is fixedly connected to the corresponding end of the cylindrical housing.

In an embodiment, each end cap selected from the pair of end caps comprises a pressure relief valve, and the set pressure of the pressure relief valve of each end cap selected from the pair of end caps is measurably distinct from one another.

In an embodiment, each end cap selected from the pair of end caps comprises a pressure relief valve, and the set pressure of the pressure relief valve of each end cap selected from the pair of end caps is measurably same.

The present hardware container invention is battery chemistry agnostic and can be used in conjunction with a broad range of energy storage systems including but not limited to, Li-ion batteries, metal-air batteries, flow batteries, capacitors, supercapacitors, and fuel cells. The invention includes applying pressure or vacuum to a gas or liquid, result in improvements to many basic sciences principles that will increase battery efficiency and performance.

The chemistry agnostic battery, capacitor, or fuel cell container for electrochemical energy storage and conversion comprises a vessel or housing to place battery chemistry elements (cathode, anode, electrolyte) with a pressure greater or less than atmospheric pressure. Generally referred to as an energy storage container, the energy storage container offers system interoperability with other, but not limited to, typical cathode/anode batteries, capacitors, supercapacitors, metal-air batteries, flow batteries, and fuel cells. Non-ambient pressures (positive or negative) inside the energy storage container offer a method to tune thermodynamic principles resulting in benefits to dozens of basic science laws to create a more efficient large-format, long-duration battery. The container is a cylinder, vessel, or any acceptable efficient shape, to hold a positive pressure or vacuum and has end cap to retain positive pressure and/or vacuum, and is made from metal, plastic, composites, or other materials. The energy storage container may be a single wall or double wall vessel. Uses of the energy storage container to hold battery chemistry elements at atmospheric pressure (not just pressure or vacuum) are also expected with the size, shape and static loads of the container offering utility in housing battery chemistry elements of large-format suitable to efficient long-duration electrochemical storage. The end cap and membranes of the energy storage container are designed to retain battery chemistry for large-format batteries at ambient and non-ambient pressures. The energy storage container also comprises or holds electrodes and/or electrode retainers, separators, and current collector (not shown in figures) in a perpendicular direction (hamburger style) and/or in the longitudinal direction (hotdog style) to the energy storage container. The electrode retainers are designed to be interoperable with any battery chemistry elements with replaceable battery elements to extend the energy storage container lifetime and enable the installation of future battery chemistry elements too. The energy storage container has over-temperature and over-pressure protections for thermal runaway protection, mitigation, and shutdown that include (but not limited to) 1) shape of cylindrical housing and end cap, 2) active/passive thermal management mechanisms, 3) primary expansion area and pressure relief of that cavity, 4) secondary expansion area, and pressure relief of that cavity, 5) tertiary fail-safe mechanism and retention envelope for the main cylinder. Over-pressure and over-vacuum fail-safe protections will safely contain any of the battery chemistry elements or hot gases from being released into the atmosphere, vehicle, structure, or internal compartment, mitigating, or shutting down thermal runaway events. The non-ambient nature of the energy storage container allows for an optimized internal environment for chemical reactions at a variety of external atmospheric pressures and temperatures experienced on earth, in space, and other planetary environments. A design feature of the container, electrode retainer, and diaphragm (membrane) allows for expansion and contraction of the cathode and anode material at different charge states and temperatures. The primary and secondary pressure relief mechanisms coupled with the diaphragm (membrane) have the ability to self-regulate thermal and charge-state expansion of the electrodes allowing a stable internal battery chemistry environment all the while providing an elegant solution for mechanical clamping pressure to the cell stack. The perpendicular retainers can also be overfilled with electrode material to a desired level, then a predetermined retainer clamping force can be provided at the time of installation of the retainer in the main cylinder, as the diaphragm (membrane) and end cap are fastened/clamped into position.

Additional features include safe interoperability with nearly any battery chemistry or battery system including but not limited to typical film NMC and LFP batteries, metal-air battery, flow battery, and expanding to fuel cells, to enable affordable and large-format long-duration storage to allow decarbonization of the electric grid. The large-format version will provide acceptable digital inertia and immediate grid response time through associated inverters, transmission, and distribution contingency. In turn, facilitating grid capacity and resiliency with existing and estimated future loads, safe operations, thermal runaway mitigation, shutdown features, and pressure control features with chemical retention. This will allow customers to monetize and profit from energy storage, sale, and arbitrage. Customers may design battery chemistry elements with recycled electrode materials in mind. The main cylinder and retainers are re-usable, so the energy storage container assembly keeps up with new battery chemistry elements and systems as they are created; battery chemistry interchangeability for life cycle extension of the energy storage container assembly; [large-format] batteries in the future will be separate in class/type by atmospheric chemistry and non-atmospheric (pressurized) chemistry; end of life recyclability of battery chemistry elements, energy storage container, and electrode retainers; and use as a safe development test bed.

6

Figure 1:
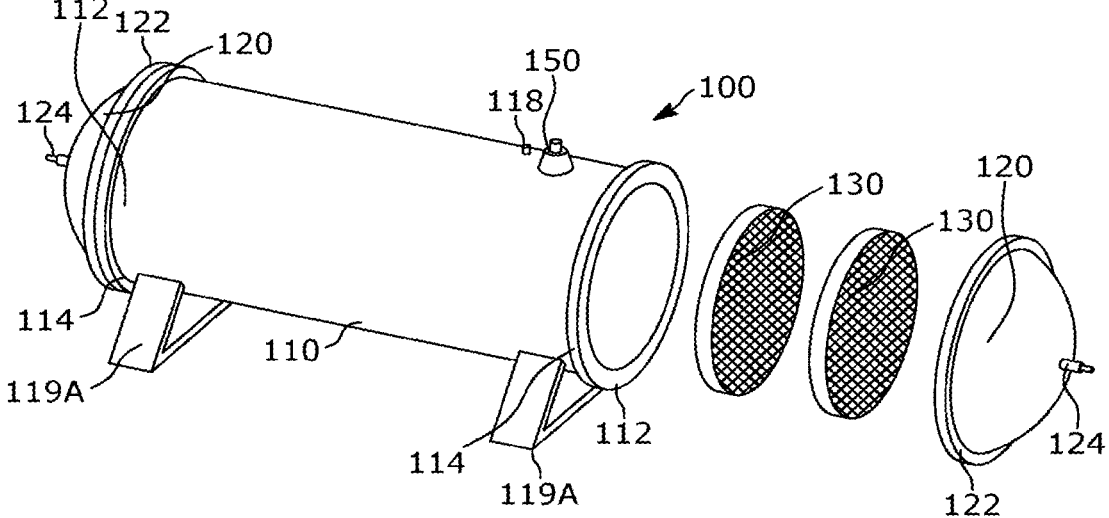
FIG. 1 illustrates a partially exploded view of an energy storage container, according to an embodiment of the present invention.
Figure 6:
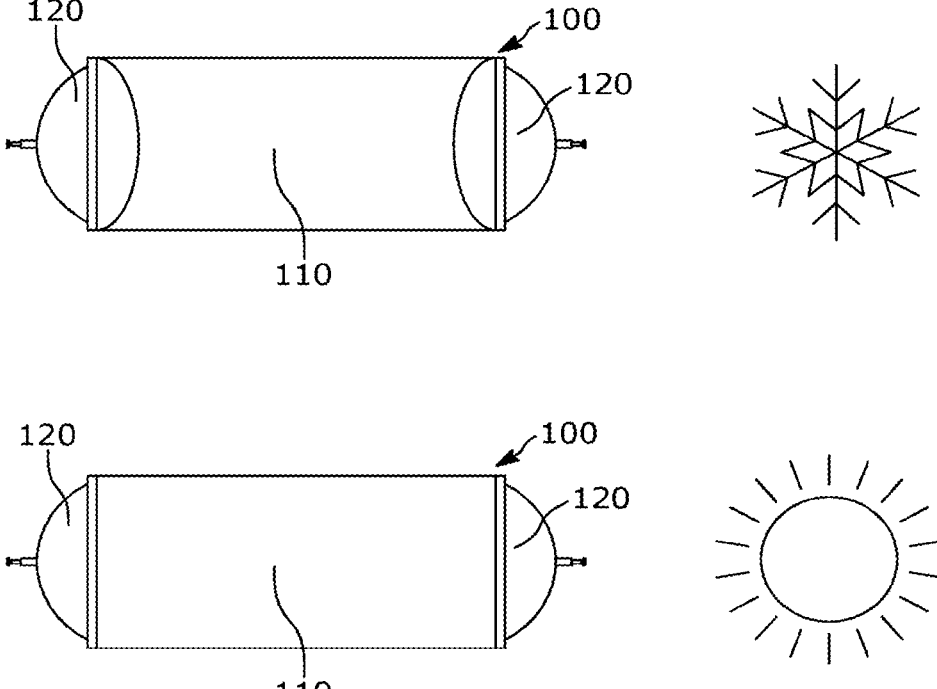

FIG. 6 illustrates an exemplary technique/method of seasonal/daily pressure or vacuum adjustments of the energy storage container of FIG. 1.

Figure 7:
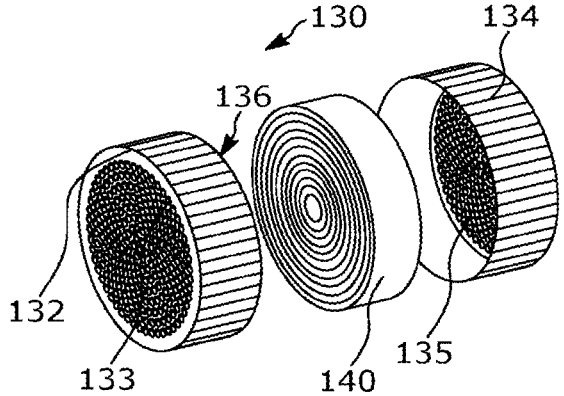
Figure 7:
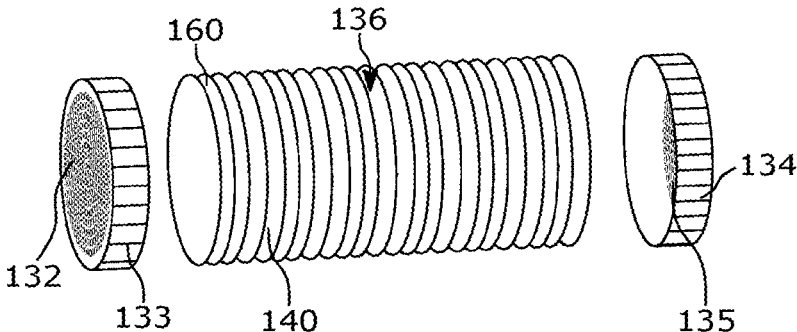

FIG. 7 illustrates an electrode retainer of the energy storage container of FIG. 1 according to a first embodiment of the present invention.

Figure 8:
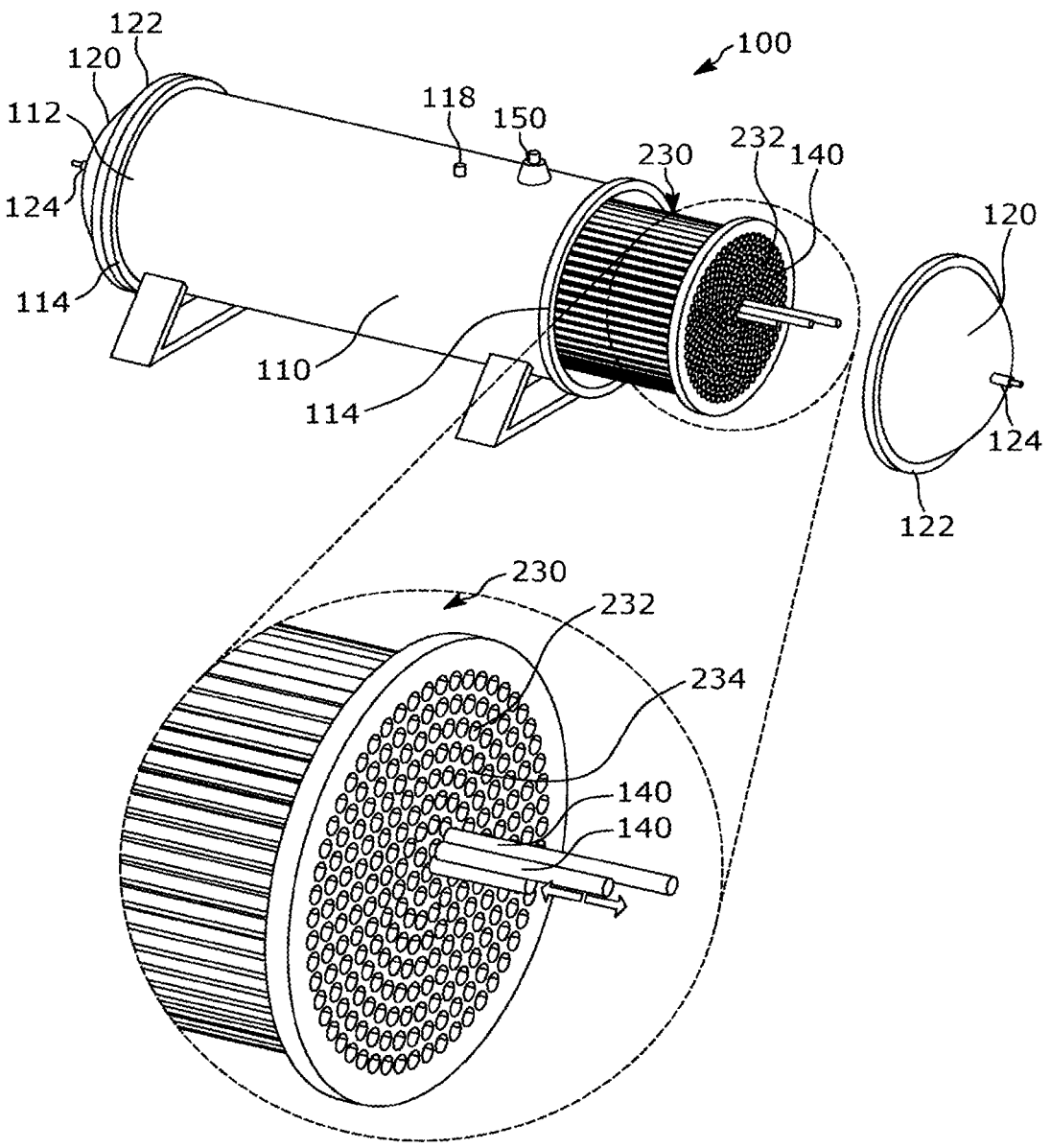

FIG. 8 illustrates an electrode retainer of the energy storage container of FIG. 1 according to a second embodiment of the present invention.

Figure 9:
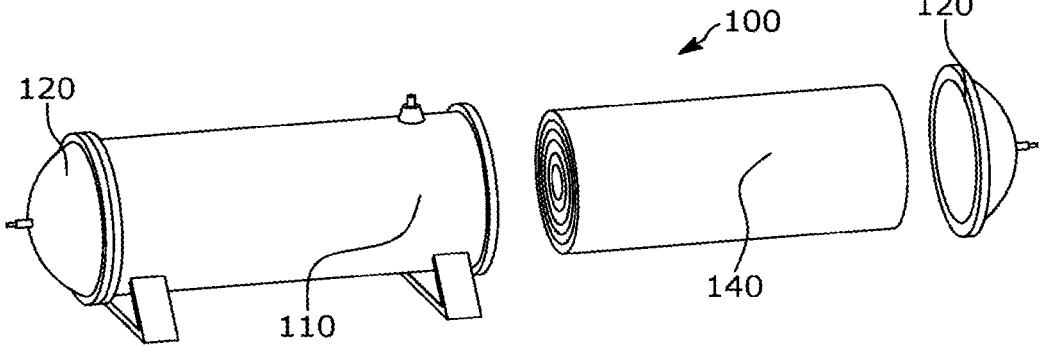
Figure 9:
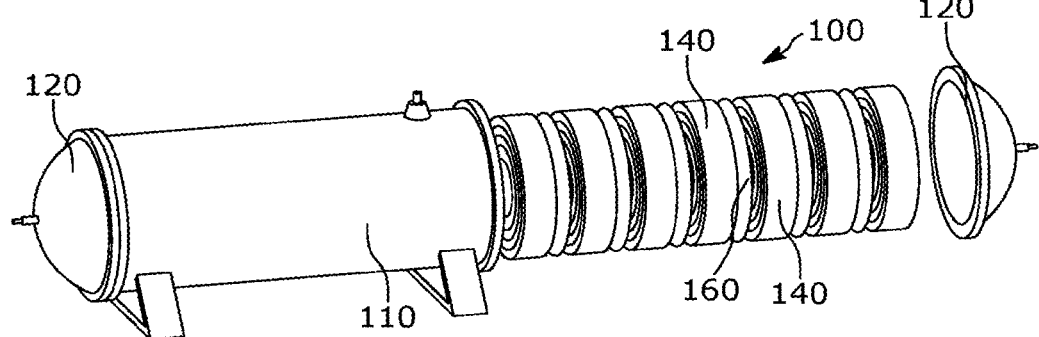

FIG. 9 illustrates a retainer-less configuration for the energy storage container of FIG. 1 according to yet another embodiment of the present invention.

Figure 10:
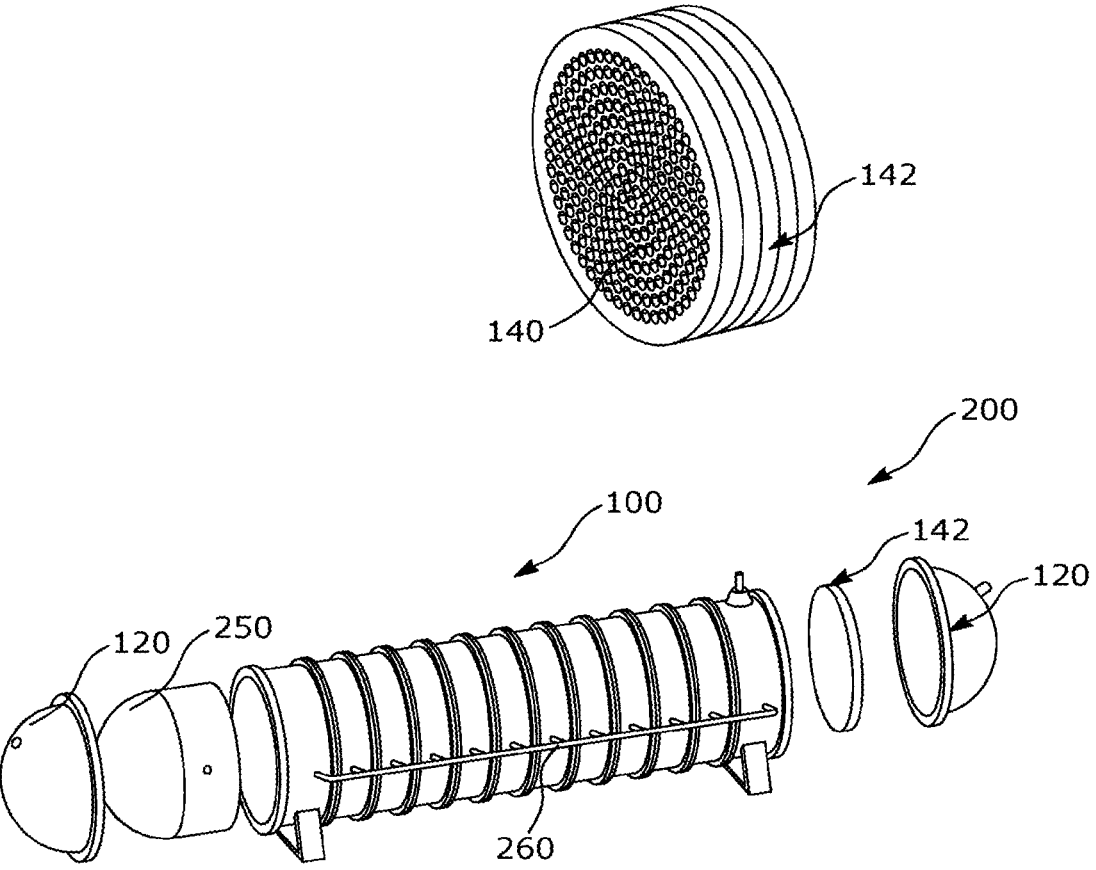

FIG. 10 illustrates various views of a metal-air battery utilizing energy storage container of FIG. 1.

Figure 11:
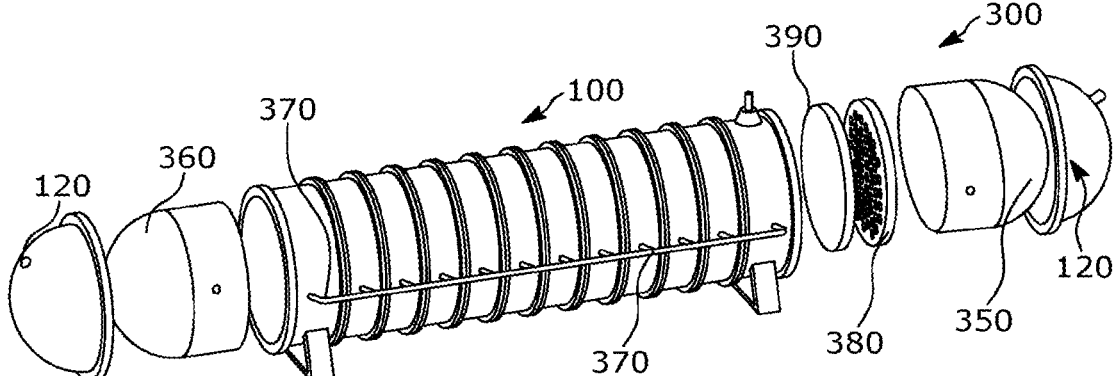

FIG. 11 illustrates various views of a flow battery utilizing the energy storage container of FIG. 1.

Figure 12:
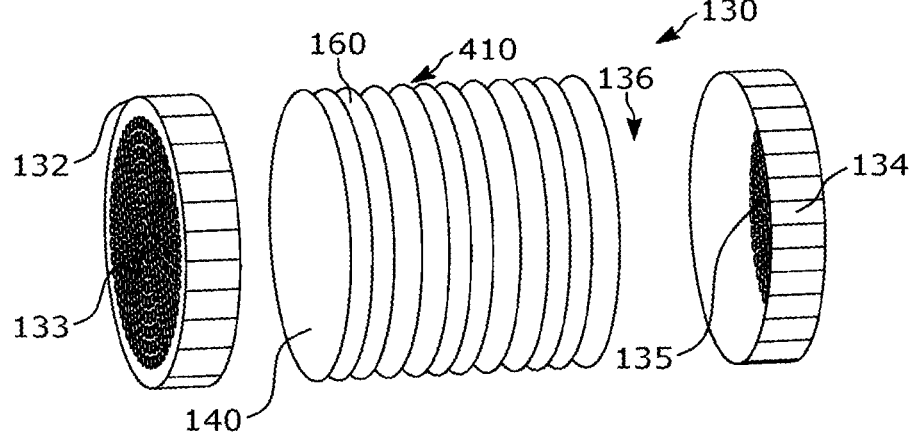
Figure 12:
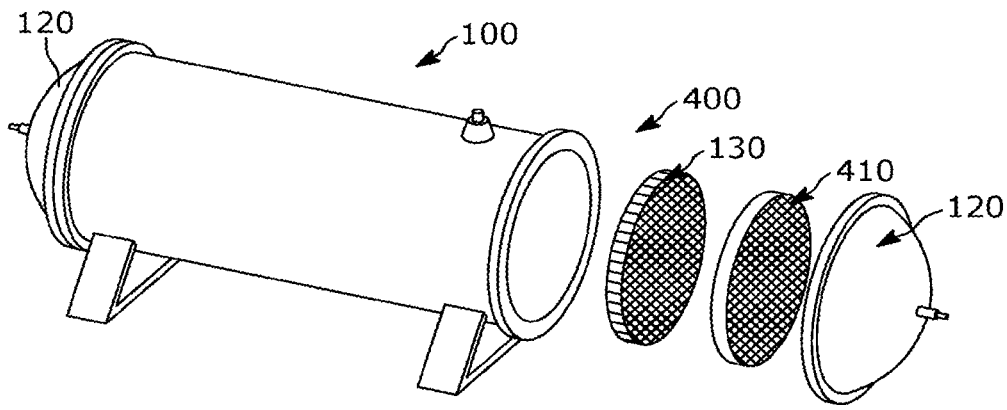

FIG. 12 illustrates various views of a capacitor and supercapacitor stack utilizing the energy storage container of FIG. 1.

Figure 13:
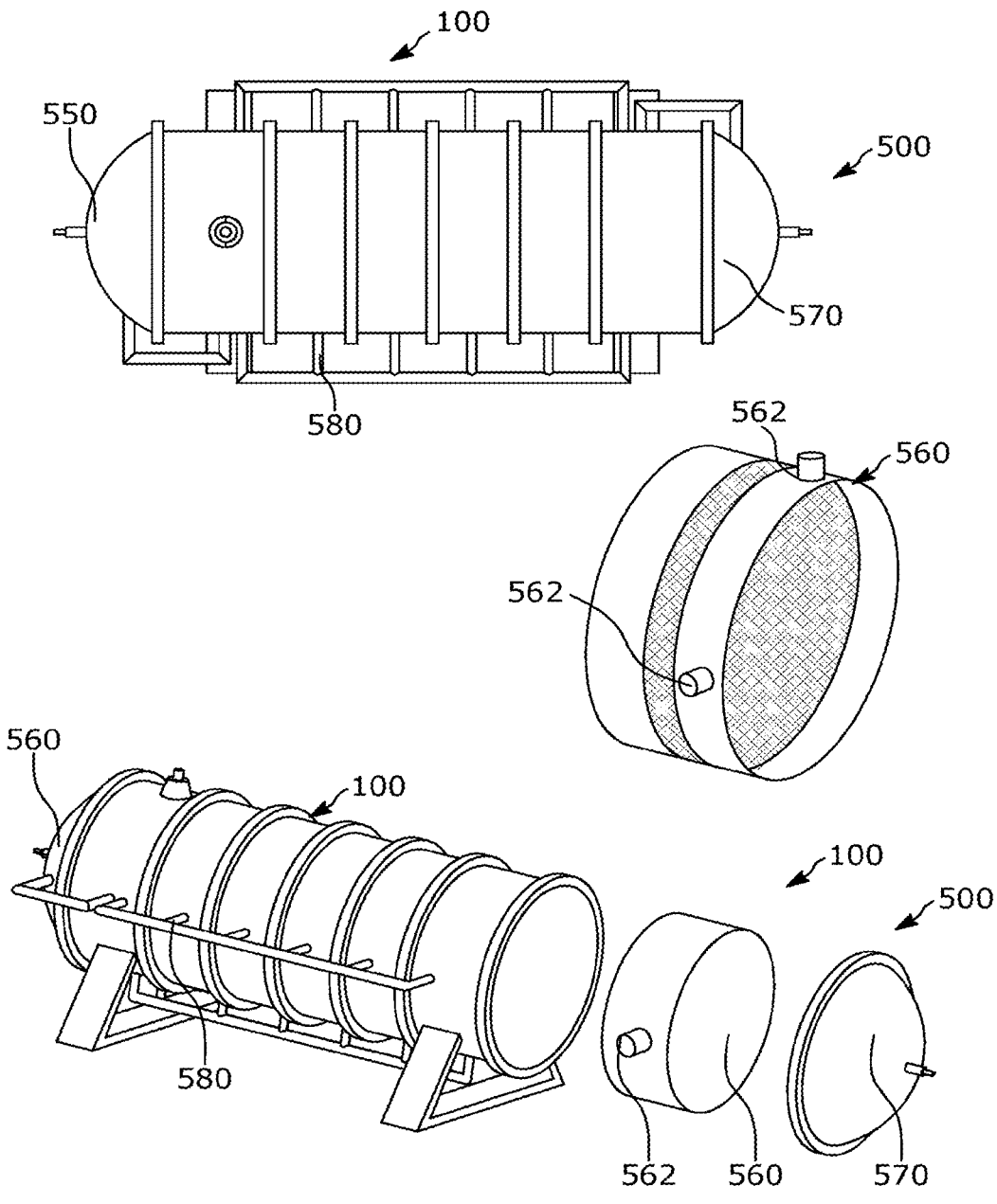

FIG. 13 illustrates various views of a fuel cell container utilizing the energy storage container of FIG. 1.

Figure 14:
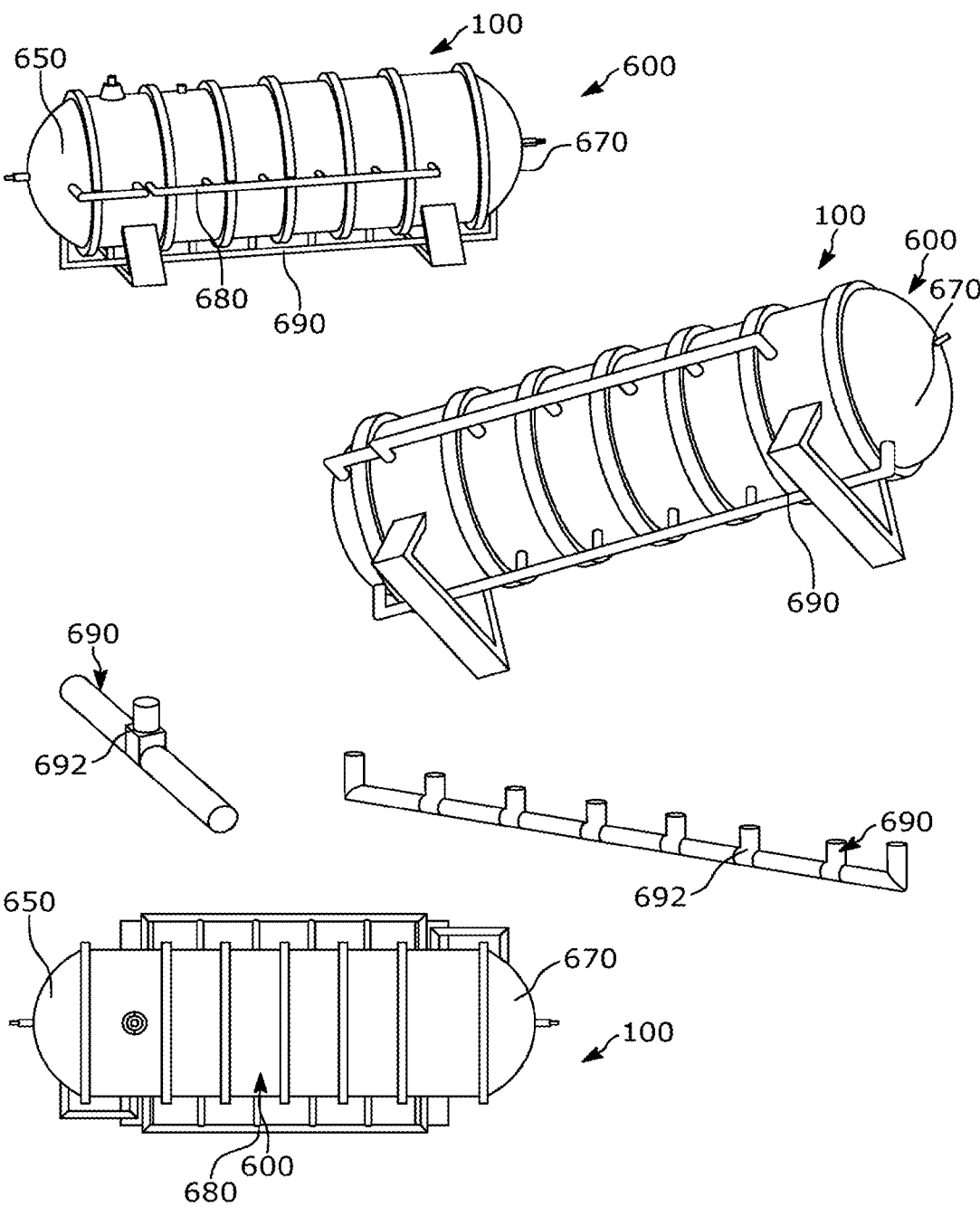

FIG. 14 illustrates various views of a reversible fuel cell utilizing the energy storage container of FIG. 1.

Figure 15:
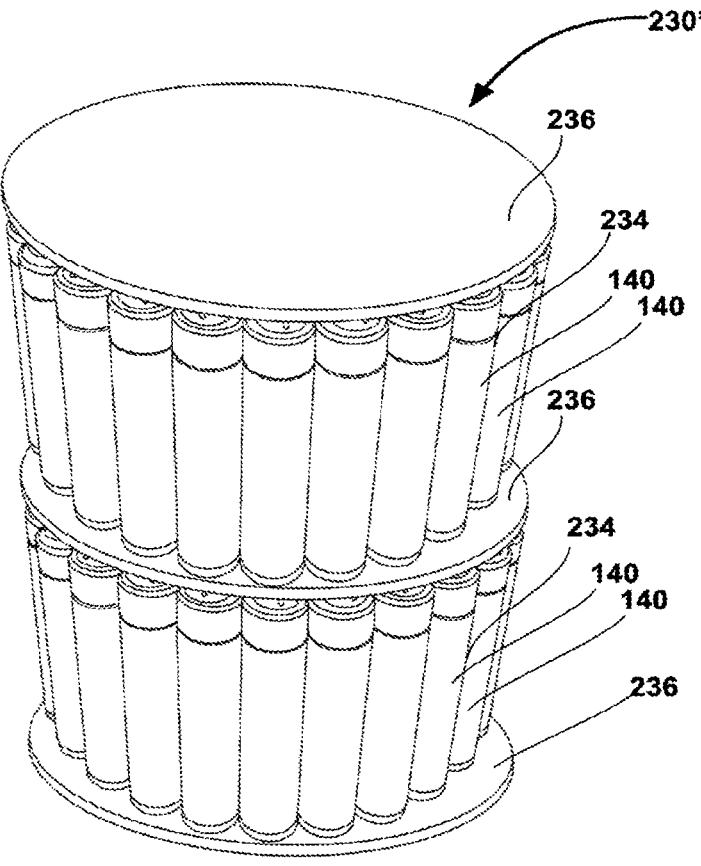

FIG. 15 illustrates a modified form of an electrode retainer of FIG. 8 according to another embodiment of the present invention.

DETAILED DESCRIPTION OF EMBODIMENTS

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below,"

"front" or "rear," may be used herein to describe one element's relationship to another element as illustrated in the Figures. It will be understood that relative terms are intended to encompass different orientations of the device in addition to the orientation depicted in the figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

The energy storage container and method of use will now be described with reference to the accompanying drawings, particularly FIGS. 1-15.

Reference is initially made to FIG. 1 that illustrates a partially-exploded view of an energy storage container 100, according to an embodiment of the present invention. The energy storage container 100 comprises a cylindrical housing 110, a pair of end caps 120, and at least one electrode retainer 130 (optional), the entirety of which will be described in greater detail in below description. The pair of end caps 120 are useful (formed) for primary pressure control and secondary pressure control, such that one end cap 120 is useful (formed) for primary pressure control and the remaining end cap 120 is useful (formed) for secondary pressure control, the entirety of which will be described in greater detail in below description. In other words, the one end cap 120 is useful (forms) for forming a primary expansion area (such as, in one example, a chamber) and the remaining end cap 120 is useful (forms) for forming a secondary expansion area, the entirety of which will be described in greater detail in below description. Further, the energy storage container 100 could comprise various safety elements (not shown in figures) and a thermal management system (not shown in figures).

Referring to FIG. 1, the cylindrical housing 110 is configured for enclosing electrodes 140 and storing electrolyte (not shown in figures) at a pressure above ambient pressure (positive pressure) or below ambient pressure (vacuum); wherein the cylindrical housing 110 comprises two opposite ends 112 spaced from each other and separated by the overall length of the cylindrical housing 110. Each end 112 selected from the two opposite ends 112 of the cylindrical housing 110 comprises a flange 114. The cylindrical housing 110 is an essential structure that is useful to create a container assembly 100 (also referred to as "energy storage container 100") so that various battery chemistry can be installed in conjunction with a pair of end caps 120 to form a closed vessel such that a positive pressure or negative pressure (vacuum) can be applied to the energy storage container 100 i.e. not clamping pressure but fluid pressure. The cylindrical housing 110 is designed to handle the large static loads of the chemistry of large-format, long-durations, batteries. The cylindrical housing 110 may have several subparts that are known in the prior art and these subparts could be designed according to various applicable standards such as but not limited to:

2. MIL-STD-1522 1972

3. MIL-STD-1522A 1984—Standard General Requirements for Safe Design and Operation of Pressurized Missile and Space Systems;

4. Change, J. B., Lou, M. C. and Huang, L. C.-P., PVP-Vol. 318, The American Society for Mechanical Engineers, 1995, Updated Requirements for Pressurized Space Systems;

5. ANSI/AIAA S-080-1998, Space Systems-Metallic Pressure Vessels, Pressurized Structures, and Pressure Components, American National Standard Institute and American Institute of Aeronautics and Astronautics, 1998;

6. ANSI/AIAA S-081-2000, Space Systems-Composite Overwrapped Pressure Vessels, American National Standard Institute and American Institute of Acronautics and Astronautics, 2000;

7. Horton, R. E., et al, Damage Tolerance of Composites—Final Report, AFWAL-TR-87-3030, 1988;

8. Change, J. B., Enhanced Technology for Composite Overwrapped Pressure Vessels, Technical Summary Final Report, Aerospace Report No. TR-99 (8504)-1, 2000 February 2000;

9. Change, J. B., Chiu, S. T. and Huang, L. C.-P. Damage Control of Space-Flight Composite Overwrapped Pressure Vessels, IAF-00-1.3.10, 51st International Astronautical Congress, 2000;

10. Babel, H. and Grimes L., AIAA Space Pressure Vessel Working Group Meeting Presentation Materials, 1998;

11. Ralph M., Tapphorn, Test Report, Impact Damage Effects and Control Applied to Composite Overwrapped Pressure Vessels, TR-806-001, NASA Johnson Space Center, White Sands Test Facility, Jul. 29, 1998;

12. Polymer Matrix Composites, MIL-HDBK-17E, January 1997;

13. Fracture Control Requirements for Payloads using the Space Shuttle, NASA-STD-5003, NASA/Headquarters, 1999;

14. Johnson, E. and Nokes, J. P. Nondestructive Evaluation (NDE) Techniques Assessment for Graphite/Epoxy (GR/Ep) Composite Overwrapped Pressure Vessels, Aerospace report, TR-908 (8504)-3, October 1998;

15. Fracture Control Implementation Handbook for Payloads, Experiments, and Similar Hardware, NASA-HDBK-P020, June 2002;

16. Lewis J. AIAA Space Pressure Vessel Working Group Meeting Presentation Materials, 1999;

17. ASME (ASME International, Three Park Avenue, New York, New York 10016-5990, www.asme.org) Boiler and Pressure Vessel Certifications, Pressure Vessels Section VIII Division 1, U—Pressure Vessels, UM—Miniature Pressure Vessels; Pressure Vessels Section VIII, Division II—U2—Pressure Vessels (Alternative Rules for Pressure Vessels); Pressure Vessels Section VIII, Division III, U3—High Pressure Vessels; Reinforced Pressure Vessels, Section X, RP-Fiber-Reinforced Plastic Vessels; and Pressure Relief Devices, Section XIII, UV—Pressure Vessel Pressure Relief Valves, UD—Pressure Vessel Pressure Relief Devices, UV3—High Pressure Vessel Pressure Relief Valves, and UD3—High Pressure Vessel Pressure Relief Devices;

18. ANSI/AIAA S-081 Revision B, 2018 Space Systems— Composite Overwrapped Pressure Vessels;

19. DNV—the independent expert in assurance and risk management, the world's leading classification society and recognized advisor for the maritime industry, Pressure Equipment and Systems; certifications provided according to DNV rules, European Directives on Pressure Equipment (PED) and Transportable Pressure Equipment (TPED), ASME, and AD 2000;

20. American Bureau of Shipping—development and verification of standards for the design, construction and operational performance of marine-related facilities, ABS Rules for Steel Vessels for Vessels Certified for International Voyages, USCG Approved 9 Jun. 2003;

21. EN ISO 11439:2000 Gas Cylinders—High Pressure Cylinders for the On-Board Storage of Natural Gas as a Fuel for Automotive Vehicles;

22. ANSI/IAS NGV 2-1998 Basic Requirements for Compressed Natural Gas Vehicle (NGV) Fuel Containers;

23. ISO 9809-1/1999 Gas Cylinders—Refillable Seamless Steel Gas Cylinders—Design, Construction and Testing—Part 1: Quenched and Tempered Steel Cylinders with Tensile Strength Less than 1100 Mpa for assembly, operation, inspection.);

24. ASTM D1784-20 Standard Classification System for and Basis for Specification for Rigid PVC compounds and CPVC Compounds;

25. ASME Class fittings and flanges to include class 150, 300, 400, 600, 900, 1500, and 2500;

26. ASME/ANSI pipe schedules for metal and plastic pipes.

In various embodiments (not shown in figures), multiple cylindrical housing 110 are fastened together to support battery, flow battery, metal-air battery, capacitor, or fuel cell in an energy storage container 100.

In various embodiments (not shown in figures), multiple cylindrical housing 110 are separated by a distance yet plumbed (fluidly or gas connected) or wired together to support battery, capacitor, fuel cell functions by using a system of multiple cylindrical housing 110.

Figure 4:
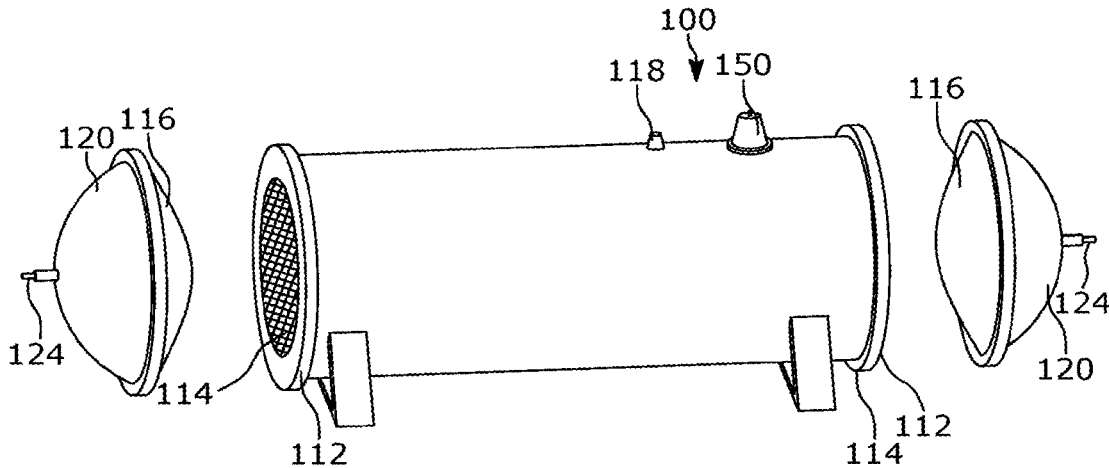
FIG. 4 illustrates an energy storage container, according to an embodiment of the present invention wherein a pair of end caps are shown detached from a cylindrical housing of the energy storage container of FIG. 1 for the sake of simplicity and understanding.

Referring to FIG. 4, a diaphragm (membrane) 116 is positioned between each end cap 120 selected from the pair of end caps 120 and the corresponding end 112 of the cylindrical housing 100 to separate units to create a separate sealed chamber and may allow electrons or ions to cross through. The split lines between multiple cylindrical housing 100 may be used to integrate structural bulkhead (not shown in figures) between the multiple cylindrical housing 100, or a hybrid system of bulkheads and diaphragm (membrane) 116. (FIGS. 10,11,13,14).

In conjunction with the pair of end caps 120, the primary function of the cylindrical housing 110 is to form a complete air-tight vessel to seal in non-ambient pressure for desirable battery chemistry reactions, thermodynamic control, and chemical retention. Long-duration energy storage will include grid, commercial, residential, vehicle and devices. It should be understood that the non-ambient pressure can mean a pressure less than atmospheric pressure (i.e vacuum or negative pressure) or pressure greater than atmospheric pressure (i.e positive pressure). The ability to draw vacuum and subsequently apply pressure on the cell level enables the cylindrical housing 110 to serve as an environmental chamber during the manufacturing process. Here, the cell can be made inert via subsequent vacuum/fill steps (with an inert gas such as Argon), followed by electrolyte injection. It may also be desirable to vary pressure/vacuum to optimize charge rates, battery capacity, discharge rates, and control temperatures and chemical reaction rates during different phases of the charge/discharge cycle. For example: slow pressure reduction to control temperature during high C charge rates (C-rate). The second main function of the cylindrical housing 110 is to house the electrode retainer(s) 130 (optional), electrolyte, and in the case of a retainer-less design (FIG. 9), the propriety electrodes 140, separators 160, and electrolyte of a specific design. With certain single and multi-cylinder assemblies the intent is to create a closed-loop environment to retain chemicals and gases for reversible chemical, thermodynamic, heat, work, and energy reactions. Further, in an embodiment, the cylindrical housing 110 acts as a pressure vessel and is configured to comply with various standards/practices such as but not limited to: ASTM (American Society for Testing and Materials), ASME (American Society of Mechanical Engineers), ANSI (American National Standards Institute) and so on to withstand (provide) clamping and pressurization forces.

The cylindrical housing 110 is constructed of suitable material to exhibit strength to resist failure or rupture, crumple or collapse while pressurized or vacuumized to significant positive and negative pressures. The material will also have strength characteristics to account for diurnal and seasonal temperature change, minor internal/external damage tolerance, expected fatigue cycles, unforeseen accidents, thermal runaway events, compressive forces from being buried, strength to account for incorporating into structures, buildings, or vehicles while having a suitable safety factor. Common materials could include but not limited to: metal, plastic, or composites. Energy storage containers designed for stationary terrestrial applications may be manufactured from metal. Applications for vehicles or marine use, where weight is a considerable factor could be manufactured from aluminum, composites, or plastic. There may be many types of materials, including Type 1—all metal; Type 2—composite overwrapped metal liner (only hoops); Type 3—composite overwrapped metal liner (optimized designs comprised from hoops and helical, as needed); Type 4—composite overwrapped plastic liner; and Type 5—all composite (not yet commercialized). Metal enclosures could be relatively easy to implement with safety, and high positive pressure and vacuum withstanding features, wherein the Metal enclosures is inclusive of Type 1, Type 2 and Type 3. Within the same metal class, Type 1 is the least expensive and has the most weight, whereas Type 3 is the most expensive and lightest weight.

Figure 5:
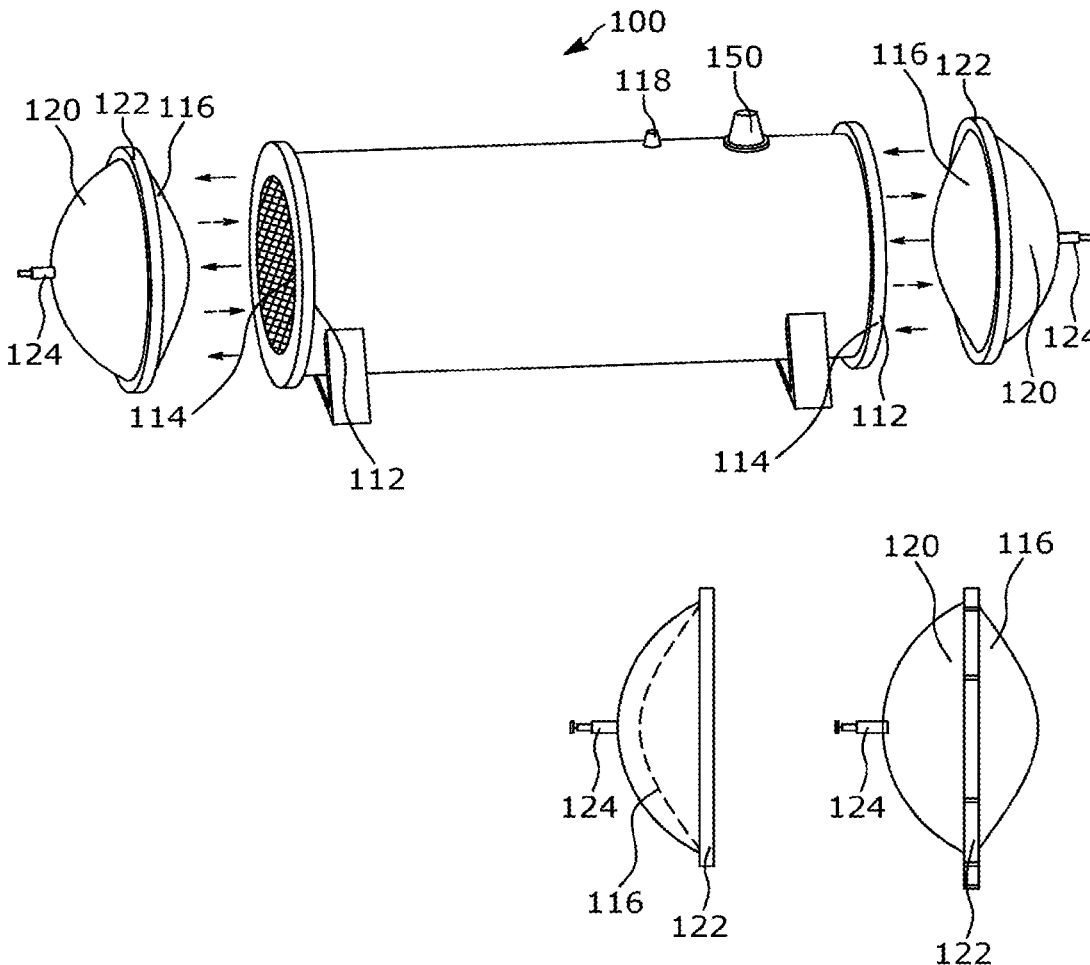
FIG. 5 illustrates an energy storage container wherein pair of end caps are shown to be applying clamping pressure towards the cylindrical housing.

The cylindrical housing 110 has a flange 114 on each end 112 of the cylindrical housing 110 to allow for installation of the pair of end caps 120 (FIG. 1 and FIG. 5). The flange 114 is made of angled material around the circumference with holes for fasteners and comply with various standards/practices such as but not limited to: 1. Farr, J. R. and Jawad, M. H., Guidebook for the Design of ASME Section VIII Pressure Vessels; ASME, 2010; 2. 2010 ASME Boiler & Pressure Vessel Code Section VIII Rules for Construction of Pressure Vessels—Division 1, ASME, 1 Jul. 2011; 3. ASME Boiler and Pressure Vessel Code 2021 Complete Set, BPVC- Complete Code—2021; and 4. ASME Class fittings and flanges to include class 150, 300, 400, 600, 900, 1500, and 2500.

In another embodiment (not shown in figures), the pair of end caps 120 may be threaded on, welded, interlocked, or bonded to the two opposite ends 112 of the cylindrical housing 110. In the case of plastic or composite material the pair of end caps 120 may be an integrated cylinder or bonded with the cylindrical housing 110. If a removable pair of end caps 120 are used, there is improved accessibility to internal parts and provides a route to simple and effective maintenance, recycling old chemistry, updating container with future chemistry systems, and replacement of internal parts. There may be many types of removable pair of end caps 120, and include a bolted flange, twist/lock, welded, or bonded. The flange 114 further allows joining multiple cylindrical housing 110 that in turn can have different pressures or vacuums yet operates as one battery system. This could apply to flow batteries, fuel cells, metal-air batteries, thermal batteries, and standard redox and electrochemical batteries.

Figure 2:
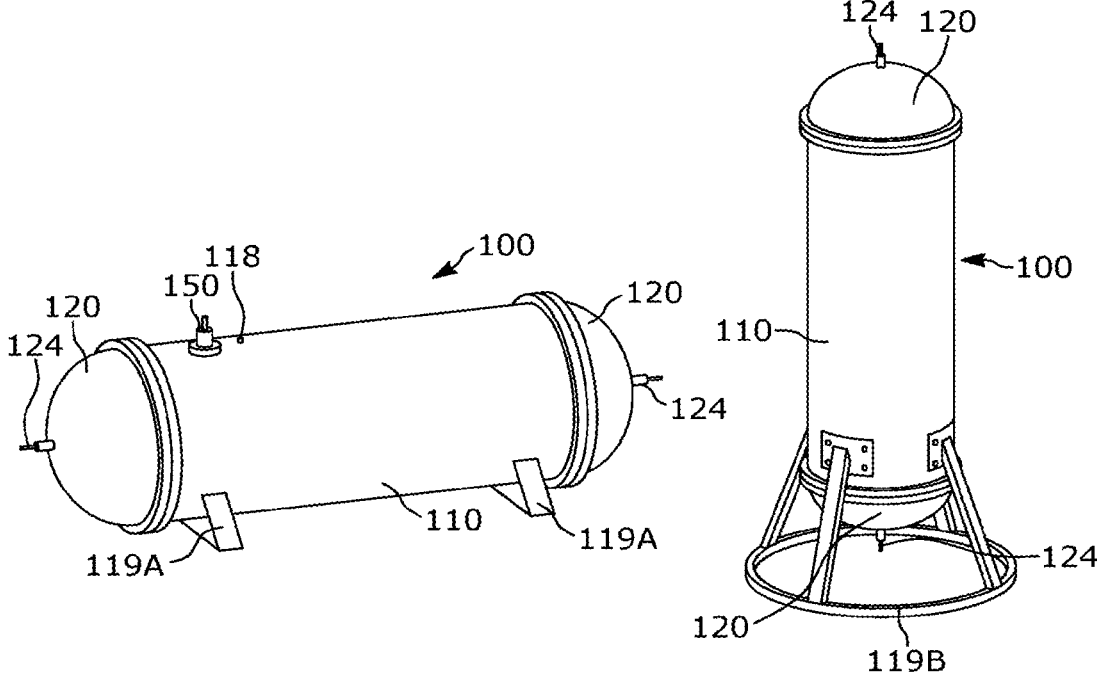
FIG. 2 illustrates various perspective views of a container in various mounting configurations.

Referring to FIG. 2, based on the mounting requirements for a stationary setup, vehicle, trailer, structure, building etc., mounting points (119A) to accommodate the horizontal mounting of the energy storage container 100 can be integrated in the form of flange fasteners 119A. Alternatively, mounting points (119B) in form of a band clamp 119B can be installed around the circumference of the cylindrical housing 110 to accommodate vertical mounting. Metal cylindrical housing 110 can have mounting points (119A, 119B) welded on. Wherein in case of plastic or composite tanks, the mounting points (119A, 119B) can be integrated into the molding or layup process.

In an embodiment, the cylindrical housing 110 comprises a fill port 118 to allow electrolyte gas or liquid to be added or removed to the cylindrical housing 110. The same fill port 118 may be used in conjunction with a shut off valve to serve multiple functions such as the pressure port and a mounting point for the over-pressure fail-safe mechanism 150 (FIG. 3), and a passage for active cooling systems. The overall emphasis is to minimize holes and fittings in the cylindrical housing 110 to reduce manufacturing cost, while preserving the overall strength of the cylindrical housing 110.

An exemplary method to pressurize the cylindrical housing 110 with a gas or liquefied gas electrolyte will now be described. Place both primary expansion area of one end cap 120 and secondary expansion area of the remaining one end cap 120 with a vacuum pulling the diaphragm (membrane) 116 of each end cap 120 out towards their corresponding end cap 120 Afterwards, seal off (shut) fittings of the primary expansion area of one end cap 120 and secondary expansion area of the remaining one end cap 120 to hold the vacuum. Afterwards, Fill cylindrical housing 110 with electrolyte liquid and/or gas using fill port 118 to a pressure just before its vapor pressure at a given temperature. Now, seal off (shut) cylindrical housing 110, at the warmest fill temperature to prevent start of condensation. Afterwards, remove vacuum from primary expansion area of one end cap 120 and secondary expansion area of the remaining one end cap 120 and pressurize the primary expansion area of one end cap 120 and secondary expansion area of the remaining one end cap 120 to battery operating pressure. The primary expansion area of one end cap 120 and secondary expansion area of the remaining one end cap 120 will apply pressure to the cylindrical housing 110 via the diaphragm (membrane) 116 and the gas or liquid electrolyte will phase shift from gas to liquid or supercritical liquid depending on the physical and chemical properties of the electrolyte.

The pair of end caps 120 provides a structure to close off each end 112 of the cylindrical housing 110 to create an energy storage container 100. The pair of end caps 120 can be welded on to the cylindrical housing 110, bonded, brazed, integrated composite, and is serviceable, inspected, repaired in accordance with various standards/practices such as but not limited to: 1. API 510 Pressure Vessel Inspection Code: In-Service Inspection, Rating, Repair, and Alteration, API RP 571—Damage Mechanisms Affecting Fixed Equipment in the Refining Industry, RP 572—Inspection of Pressure Vessels, RP 576—Inspection of Pressure-Relieving Devices, RP 577 Welding Inspection of Metallurgy, PR 578—Material Verification Program for New and Existing Alloy Piping Systems, PR 579—Fitness-For-Service, PR 580—Risk-Based Inspection, RP 580—Risk-Based Inspection, Publ 581—Risk-Based Inspection-Base Resource Document, RP 582—Recommended Practice and Supplementary Welding Guidelines for the Chemical, Oil, and Gas Industries, Publ 2201—Procedures for Welding or Hot Tapping on Equipment in Service, and API 510 Inspector Certification Examination Body of Knowledge; 2. ASME Boiler and Pressure Vessel Code, Section V: Non-Destructive Examination, Section VIII: Division 1, Rules for Construction of Pressure Vessels, Section VIII: Division 2, Rules for Construction of Pressure Vessels—Alternative Rules, Section IX: Welding and Brazing Qualifications, and PCC-1 Guidelines for Pressure Boundary Bolted Flange Joint Assembly; 3. ASNT (The American Society for Nondestructive Testing, 1711 Arlingate Lane, Columbus Ohio 43228-0518, www.asnt.org) CP-189 Standard for Qualify Personnel Qualification and Certification in Nondestructive Testing; 4. NACE (NACE International, 440 South Creek Drive, Houston, Texas 77084, www.nacc.org) RP 0472 Methods and Controls to Prevent In-Service Environmental Cracking of Carbon Steel Weldments In Corrosive Petroleum Refining Environments and MR 0103 Materials Resistant to Sulfide Stress Cracking in Corrosive Petroleum Refining Environments; 5. National Board (The National Board of Boiler and Pressure Vessel Inspectors, 1055 Crupper Avenue, Columbus, Ohio 43229, www.nationalboard.org) NB-23 National Board Inspection Code; 6. WRC (Welding Research Council, P.O. Box 201547, Shaker Heights, Ohio 44120, www.forengineers.org) Bulletin 412 Challenges and Solutions in Repair Welding for Power and Processing Plants; and 7. OSHA (Occupational Safety and Health Administration, 200 Constitution Avenue, NW, Washington DC 20210, www.osha.gov) 29 CFR Part 1910 Occupational Safety and Health Standards.) Shapes of the end cap 120 are designed in accordance with primary references and industry standards (Pressure Vessel Design Manual, Dennis Moss; Pressure Vessel Handbook, Eugene Megyesy; Pressure Vessel Design Handbook, Henry Bednar; Modern Flange Design Bulletin 502, Taylor Forge; Shigley Joseph E, Mechanical Engineering Design 2003, Sixth Edition, McGraw Hill, Boston; ASME Boiler and Pressure Vessel Code, Section VIII, Divisions 1, 2, and 3, ASME II, Part D, and ASME V; Europe, EN-13445; Germany, A. D. Merkblatt Code; United Kingdom, British Standards BS 5500; France, CODAP; and China, GB-150). Each flange 122 of each end cap 120 provides a surface to clamp diaphragm (membrane) 116 or structural support bulkhead (not shown in figures) for different applications. The flange 122 and closure methods are designed in accordance with various standards/industry practices, such as but not limited to: ASME Class fittings and flanges to include class 150, 300, 400, 600, 900, 1500, and 2500.

The main purpose of the end cap 120 is to seal the ends of the cylindrical housing 110 so that various pressures may be applied to the inside of the cylindrical housing 110 and creates the primary expansion arca associated with one end cap 120 and secondary expansion arca associated with the remaining end cap 120. There are also several other secondary functions associated with the end cap 120. The split line between the end cap 120 and the cylindrical housing 110 can be sandwiched with a diaphragm (membrane) 116 of suitable material to apply an associated pressure to the cylindrical housing 110. At the same time, the diaphragm (membrane) 116 may, but doesn't have to, allow electrons, ions, protons to cross between the cylindrical housing 110 area from/to the expansion area to assist in charge/discharge cycles and chemical reactions in the cylindrical housing 110. The end cap 120 may also incorporate mounting locations, fittings for applying pressure, pressure relief valve 124, and mounting points for horizontal or vertical installations (FIG. 2). The shape of the end cap 120 is consistent with many standard designs/standards/design practices of pressure vessels optimized to hold significant positive and negative pressures such as but not limited to: 1. Pressure Vessel Design Manual, Dennis Moss; Pressure Vessel Handbook, Eugene Megyesy; Pressure Vessel Design Handbook, Henry Bednar; Modern Flange Design Bulletin 502, Taylor Forge; Shigley Joseph E, Mechanical Engineering Design 2003, Sixth Edition, McGraw Hill, Boston.

A structural support bulkhead (not shown in figures) may be installed at flange 122 split-line and aids in strengthening the cylindrical housing 110 in a radial direction while adding certain characteristics to support the working of the diaphragm (membrane) and may be a method to electrically conduct electrons to and from the battery and associated load 116. The end cap 120 and cylindrical housing 110 may be fitted with pressure-tight feed through fittings (not shown in figures) for electrical connectors, sensors, battery management controls, and SCADA (Supervisory Control and Data Acquisition) controls.

The end cap 120 can be made of metal, composites or plastics based on specific pressure needs, internal chemistry requirements, external environmental requirements, electrical insulation, dimensions, weight etc.

The metal end cap 120 has a flange 122 of suitable thickness that complies with various standard designs/standards/design practices such as but not limited to: Pressure Vessel Design Manual, Dennis Moss; Pressure Vessel Handbook, Eugene Megyesy; Pressure Vessel Design Handbook, Henry Bednar; Modern Flange Design Bulletin 502, Taylor Forge; Shigley Joseph E, Mechanical Engineering Design 2003, Sixth Edition, McGraw Hill, Boston; ASME Class fittings and flanges to include class 150, 300, 400, 600, 900, 1500, and 2500.

The flange 122 could further comprise holes (not shown in figures) for fasteners (not shown in figures) to be joined to the cylindrical housing 110. To create the primary expansion arca and secondary expansion arca, a diaphragm (membrane) 116 and/or a structural bulkhead (not shown in figures) (not shown in figures) spanning the circumference of end cap 120 and cylindrical housing 110 may be clamped between the flanges 122 with fasteners (not shown in figures). The flange fastener (not shown in figures) may be a desirable place to attach mounting brackets (not shown in figures) for horizontal and vertical applications, or integration with a pack, structure, vehicle, or buildings.

A pressure port (not shown in figures) in the form of threaded fitting in the end cap 120 with a shutoff valve allow various pressures to be applied to the primary or secondary primary expansion area and secondary expansion area of each end cap 120 to pre-charge the cylindrical housing 110 area with a positive pressure or vacuum. The pressure port (not shown in figures) is configured to introduce fluid in the corresponding end cap 120.

The end cap 120 of the primary expansion arca as well as secondary expansion arca have a pressure relief valve 124 to release any over-pressure from thermal runaway event transferred to the expansion area from the cylindrical housing 110, thereby relieving pressure to the cylindrical housing 110 while allowing the battery chemistry and hot gases to remain in the cylindrical housing 110. In an embodiment, the set pressure of the pressure relief valve 124 of each end cap 120 selected from the pair of end caps 120 is measurably distinct from one another. For instance, In an exemplary embodiment, The pressure relief valve 124 of primary expansion area will have a lower activation set pressure and the secondary expansion area pressure relief valve will have a higher activation set pressure. In another embodiment (not shown in figures), If active liquids, gases, or solids materials are stored in the primary expansion area and secondary expansion area or intended to cross the diaphragm (membrane) 116 then it could be desirable to fit a retention envelope (not shown in figures) upstream to that particular pressure relief valve 124. In another embodiment (not shown in figures), the set pressure of the pressure relief valve 124 of each end cap 120 selected from the pair of end caps 120 is measurably same.

The end cap 120 could have brackets (not shown in figures) attached by fastener (not shown in figures) or welding to the end cap 120 itself or attached to the flange 122 with fasteners (not shown in figures) for vertical or horizontal installation of the energy storage container assembly. In the case of composite or plastic materials, the mounting bracket (not shown in figures) can be integral to the end cap 120.

Typical shapes for the end cap 120 that make up the pressure vessel head could be elliptical, flat, 10% dish, standard dish, conical, semi-elliptical, hemispherical, inverted etc. The shapes could comply with various standards/design practices such as but not limited to: Pressure Vessel Design Manual, Dennis Moss; Pressure Vessel Handbook, Eugene Megyesy; Pressure Vessel Design Handbook, Henry Bednar; Modern Flange Design Bulletin 502, Taylor Forge; Shigley Joseph E, Mechanical Engineering Design 2003, Sixth Edition, McGraw Hill, Boston. In various embodiments (not shown in figures), the end cap 120 may be fastened to the cylindrical housing 110 with a two flange and fastener method, welded with metal, or formed as an integrated piece to cylindrical housing 110 with plastics or composites.

Figure 3:
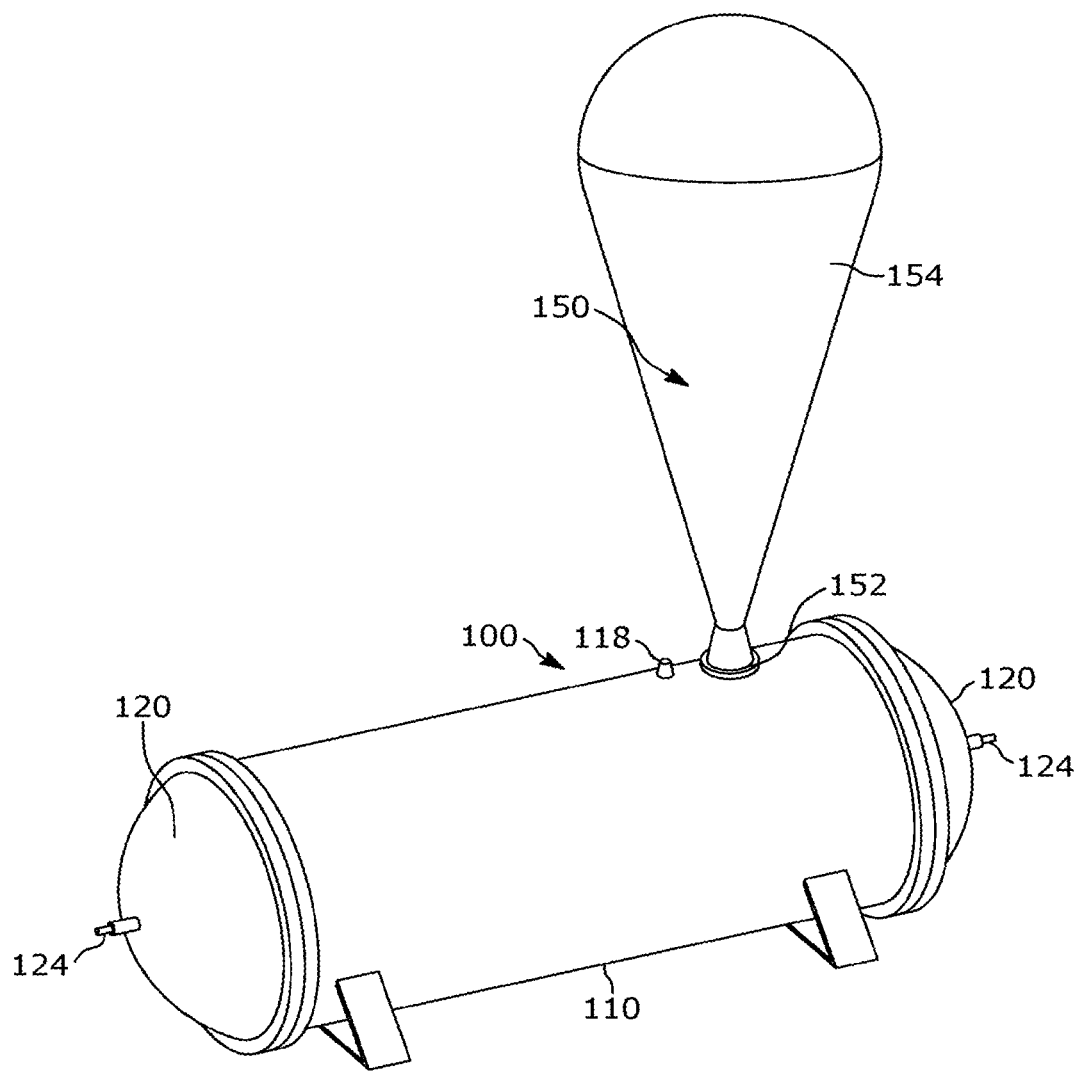
FIG. 3 illustrates an over-pressure fail-safe mechanism of the energy storage container of FIG. 1, according to an embodiment of the present invention.

Referring to FIG. 3, the over-pressure fail-safe mechanism 150 is the tertiary (third) pressure fail-safe mechanism and safety feature of the cylindrical housing 110, that is designed to mitigate and shut down catastrophic thermal runaway events of the energy storage container 100 and only actuates after a pressure relief valve 124 of the primary expansion arca and pressure relief valve 124 of the secondary expansion area have exceeded their set activation limits (second set pressure). In an embodiment, the over-pressure fail-safe mechanism 150 comprises a pressure relief valve 152 that is configured to activate when pressure exceeds a second set pressure wherein the second set pressure corresponds to a larger value selected from the pressure relief valve 124 of the primary expansion area and pressure relief valve 124 of the secondary expansion arca. After the pressure relief valve 124 of the primary expansion arca and pressure relief valve 124 of the secondary expansion area have been activated by a sequential increase in pressure rise, the third and final mechanism is the over-pressure fail-safe mechanism 150. An envelope 154 is connected downstream to the pressure relief valve 152; wherein the envelope 154 is configured to be filled with contents of the cylindrical housing 110 of the energy storage container 100. The over-pressure fail-safe mechanism 150 has two functions that operate automatically in a multiple-mode manner depending on the pressure of the contents in the cylindrical housing 110 of the energy storage container 100. The first mode activation releases at least some contents such as pressure and hot gases, and chemicals of the cylindrical housing 110 into the envelope 154 that is dimensioned to depower the cylindrical housing 110 of the energy storage container 100 chemically, shutting down thermal runaway event, yet retain the chemicals in envelope 154 preventing a release to the atmosphere. In the unlikely event that the cylindrical housing 110 of the energy storage container 100 remains powered up after this significant dump of chemicals, the second mode activation of the over-pressure fail-safe mechanism 150 is a metered release of at least some contents from the envelope 154 thereby venting pressure to the atmosphere. Thus, the over-pressure fail-safe mechanism 150 prevent release of chemicals and gas into the atmosphere by retaining them in the envelope 154 until second mode of the over-pressure fail-safe mechanism 150 is activated, shutting down thermal runaway. In an embodiment, the envelope 154 further comprises a pressure relief valve (not shown in figures) that is configured to release a metered quantity of at least some contents of the cylindrical housing 110 of the energy storage container 100 in the atmosphere when the pressure of the released contents in the envelope 154 exceeds a third set pressure wherein the third set pressure corresponds to pressure limit (capacity) of the envelope 154. The second mode is activated only after activation of the first mode when the pressure of the released contents in the envelope 154 exceeds a third set pressure wherein the third set pressure corresponds to the pressure limit (capacity) of the envelope 154.

In another embodiment (not shown in figures), the over-pressure fail-safe mechanism 150 comprises a rupture disk (not shown in figures) that is configured to rupture when pressure exceeds a second set pressure wherein the second set pressure corresponds to a larger value selected from the pressure relief valve 124 of the primary expansion area and pressure relief valve 124 of the secondary expansion area.

Thermal runways mitigation using over-pressure fail-safe mechanism 150 may be desirable for certain battery chemistry and installations. This will not be the only way to adjust the pressure in the cylindrical housing 110. This may be achieved by adjusting the pressure, and thereby volume, of the primary expansion area and secondary expansion area to achieve similar desirable pressurization and adjustment results.

The primary pressure control and secondary pressure control simultaneously provide clamping force to a stack of electrodes 140 or electrode retainer(s) 130 (optional) and pressure control to mitigate and/or shutdown thermal runaway while retaining chemistry and hot gasses to the cylindrical housing 110.

The primary pressure control and secondary pressure control and associated relief areas are formed by clamping a diaphragm (membrane) 116 (may be conductive, insulator, gas diffusion, proton exchange, or ion selective material, or other) between the flange 114 of the cylindrical housing 110 and the flange 122 of the corresponding end cap 120. The area in the end cap 120 created is isolated from the cylindrical housing 110 yet allows pressures to be transferred between the separated chambers. An energy storage container 100 may be operated without the primary and secondary pressure control features or can have one or more pressure control areas installed.

The main purpose of the primary pressure control and secondary pressure control is to function as a damper or pressure accumulator that will allow a consistent operating environment inside the cylindrical housing 110 during charge/discharge cycles, adjustments for diurnal and seasonal temperature changes and solar heating factors, and to automatically adjust to thermal and charge-state expansion/contraction of the electrodes 140 regulating the cell stack clamping pressure. Based on specific design criteria and battery chemistry performance, pressures desired in the cylindrical housing 110 can be maintained more consistently over daily operating range and charge/discharge state, with specified pressures and adjustments to pressures in the primary expansion area and secondary expansion area. These may include positive pressure or vacuum pressure required for the intended result. The second purpose of the primary expansion area and secondary expansion area is to relieve pressures transferred from the cylindrical housing 110 to mitigate and shut down thermal runaway events, while keeping battery chemistry in the cylindrical housing 110 area via the diaphragm (membrane) 116 or structural bulkhead (not shown in figures) and set at critical activation pressures for the relief valves. A certain and specific volume/pressure (based on shape of end cap 120) can be relieved at each primary and secondary-stage relief activation allowing a commensurate temperature adjustment simultaneously. A design feature contains battery chemistry and hot gases to the cylindrical housing 110 while pressures in the cylindrical housing 110 area are reduced, first mitigating, and possibly shutting down thermal runaway event. Once the battery cools and pressures are reduced, the primary expansion area and secondary expansion area can be automatically re-serviced by the battery management system (BMS) to the designed pressures to suit the specific battery chemistry in the cylindrical housing 110 area and the battery can remain in operation, offering a self-repair, self-resetting battery safety feature. A third design feature of the primary expansion area and secondary expansion area may be used to apply varying pressure to the cylindrical housing 110 area during assembly and manufacture process to phase change electrode material 140, electrolytes, and sublimate chemical elements and then initiate the energy storage container 100 into service. The phase change and sublimation characteristic will be useful for certain chemical reactions in operation too.

Various pressure control system operation will now be described in reference to FIGS. 1-6.

Example 1 Positive Pressure: cylindrical housing 110 is filled to 1000 PSI (pound per square inch) positive pressure with a 1300 PSI tertiary pressure (over-pressure fail-safe mechanism 150) relief failsafe setting. The primary expansion area is pressurized to 1000 PSI with zero net pressure acting on the diaphragm (membrane) 116 during normal operating range with a 1100 PSI pressure relief valve setting (also referred as first set pressure). A secondary expansion area pressurized to 1000 PSI with zero net pressure acting on the diaphragm (membrane) 116 during normal operation, and a 1200 PSI pressure relief valve setting. As a thermal runaway event proceeds and the cylindrical housing 110 pressure increases to 1100 PSI, with 100 PSI acting on both diaphragm (membrane) 116, cylindrical housing 110 pressure is transferred to the primary expansion area and secondary expansion area, just as the primary pressure relief valve 124 is activated. As the primary expansion area is evacuated, the pressure and temperature (Gay-Lussac's Law) of the cylindrical housing 110 is reduced at a level correlated with the volume of the end cap 120 and the space the diaphragm (membrane) 116 can fill. Chemical liquids and gases are retained to the cylindrical housing 110 during this first stage of thermal runaway mitigation, potentially shutting down thermal runaway event. The secondary pressure relief valve could be set at 1200 PSI (also referred to as second set pressure). If a thermal runaway event continues the next line of defense to prevent catastrophic container failure is the secondary expansion area and associated pressure relief valve 124. Similar to the primary pressure relief, the cylindrical housing 110 could need to reach 1200 psi with 200 psi acting on diaphragm (membrane) 116 for the secondary pressure relief valve 124 to activate, and again the cylindrical housing 110 pressure and temperature could be reduced by an amount correlated to the evacuated volume of the end cap 120 design. This is the second stage of thermal runaway mitigation, potentially shutting down thermal runaway event and still retaining chemicals to the cylindrical housing 110. In the rare event that the first two tiers of pressure control do not mitigate a thermal runaway event, the over-pressure fail-safe mechanism 150 (tertiary failsafe) will chemically shut down the battery, while retaining chemicals and hot gases to the envelope 154, with a metered release of gases to the atmosphere if the envelope 154 design pressure (third set pressure) is reached. The automatic multi-mode release of pressure mitigates thermal runaway and prevents a catastrophic failure of the energy storage container 100 and retains chemicals and hot gases to the container until the second mode of the tertiary failsafe. For thermodynamically consistent battery chemistry operations and to account for seasonal and diurnal (or other timeframes) temperatures changes, the initial pressurization of the cylindrical housing 110 and primary pressure relief valve 124/secondary pressure relief valve 124/pressure relief valve 152 may be set 25 PSI lower in summer months and 25 PSI higher in winter months (FIG. 6).

Example 2: Ambient Pressure: An ambient or near-ambient energy storage container 100 with pressure relief and battery chemistry retention features may be desired. The requirement for large-format, long-duration, electrochemical energy storage necessitates a large-format grid/industrial/commercial energy storage container 100 sized, that, regardless of the positive pressurization, vacuum or ambient, the sheer mass of the electrodes and electrolytes will require a liquid/gas/solid container or vessel with levels static strength and pressure relieving safety features and chemistry retention characteristics in the case of a thermal runaway, pressure, expansion or chemical element escape type events. An ambient battery, without a chemical retention requirement, could be vented to the atmosphere, yet still use the primary expansion arca and secondary expansion arca, and the diaphragm (membrane) 116 for pressurization and physical clamping force (FIG. 5) as electrode material expands and contracts with solar heating or charge/discharge state heating and cooling. If physical clamping forces are not required, then an ambient battery may be designed to operate without the diaphragm (membrane) 116 clamped up between the flanges 114 and flanges 122 and that space can be used for battery chemistry elements. For battery chemistry designed for ambient pressure requirements, the primary expansion area will provide positive and vacuum pressure relief in terms of relief mechanisms installed in that end cap

120 to provide positive/negative pressure (e.g.: 3 PSI positive pressure and 3 PSI negative pressure) relief simultaneously as battery chemistry elements inside the cylindrical housing 110 heats/cools and expands/contracts. The secondary pressure relief arca will also provide positive and negative pressure relief simultaneously but at a designed tier higher (Ex: 6 PSI positive pressure and 6 PSI negative pressure). A tertiary pressure relief (over-pressure fail-safe mechanism 150), if needed, could be attached anywhere on the cylindrical housing 110 to shutdown thermal runaway events preventing catastrophic failure of the energy storage container 100. With these ambient and near ambient batteries, suitable materials for the cylindrical housing 110 and end cap 120 may be plastics, aluminum, or light weight composites.

Example 3: Vacuum Pressure: Capacitors 400 (FIG. 12) of a variety of sizes and designs use a vacuum as a dielectric for insulative purposes. For example, the energy storage container 100 can house the required plates, oil, and other assemblies of a power factor correction capacitor. When the energy storage container 100 has a 500 PSIG (pounds per square inch gauge) vacuum drawn on it, the primary pressure/vacuum relief control area could have a 500 PSIG vacuum also (with 0 psi acting on membrane), and vacuum relief valves set at 525 PSIG ready to draw in ambient area to control an over-vacuum condition preventing damage to the cylindrical housing 110. If the over-vacuum condition progresses further, the secondary vacuum relief valve that is set at 550 PSIG while actively providing even more protection to the cylindrical housing 110. Both vacuum relief mechanisms prevent ambient air from mixing with the internal elements of the capacitor and the condition is field-repairable, or automatically reset by the device management systems.

The energy storage container 100 is designed to be a large-format energy storage device. Chemists, engineers, and scientists can further design platforms for terrestrial and space-based batteries/capacitors/fuel cells using the energy storage container 100 that operate efficiently at a range of vacuum or positive pressures for charging, discharging, storage, for all or a portion of the entire electrochemical, redox reaction or capacitor cycle.

There is preliminary research to evaporate/sublimate material onto cathodes and anodes, similar to electroplating, and the vacuum pressures could facilitate the sublimation. One example is a solid electrolyte being evaporated/sublimation to a gas to provide a suitable electrolyte. The pressure component of the container shall be suitable for vacuum pressures and provide pressure differential protection of over vacuum conditions and over-pressure conditions simultaneously and may be adjust on a diurnal or seasonal, or other timeframes (FIG. 6).

Example 4: Simultaneous pressure and vacuum: There could be a positive pressure placed on the cylindrical housing 110 with a vacuum pressure placed on the electrode retainers 130, creating a pressure differential between the two components. In part to assist ions, protons, electrons, electrolyte, or chemicals across a diaphragm (membrane) 116 or other barrier, but also to provide desirable pressure or vacuum at the intended electrode 140 for temperature control, increase intercalation, increase decomposition voltage, decrease resistance, etc. Or a vacuum pressure placed on the cylindrical housing 110 with positive pressure placed on the electrode retainers 130. In the case of certain batteries like metal-air battery 200 (FIG. 10), flow batteries 300 (FIG. 11) and fuel cells (400,500) (FIGS. 13-14) for example, cylindrical housing 110 sections joined by flange, plumbing, or electrical wires may have alternating pressures and vacuum for the intended charge, discharge, or storage cycle of that particular electrode 140, based on pressure, temperature and performance requirements. To provide further detail with a particular battery system, a flow battery 300 (FIG. 11) could be well suited to a positive pressure on the cathode side of the system (to include tanks, plumbing, and electrode) and vacuum on the anode side of the system (to include tanks, plumbing, and electrode) for charging. The opposite pressure on the flow battery 300 (FIG. 11) anode/cathode sides could provide desirable performance for discharge reactions, vacuum pressure on the cathode side of the system and positive pressure on the anode side of the system.

Broadly speaking, it may be desirable to charge batteries/capacitors/cells/retainers at a certain pressure/vacuum, store at some other desired pressure/vacuum, and discharge at another.

In another embodiment (not shown in figures), a bladder (not shown in figures), similar to a ballonet used in airship buoyancy control, is installed in the end caps 120, or mid-cylindrical housing 110, or inside the center of a jelly roll or other location in the energy storage container 100 allowing pressure/temperature control, chemical retention features and radial clamping forces on the electrode materials 140. The bladder (not shown in figures) is primarily useful for the primary pressure control and secondary pressure control. This embodiment could be useful in a plastic molded or composite vessel with integrated end cap 120 that do not have a diaphragm (membrane) 116 installed.

Referring to FIGS. 1-9 and in particular FIG. 7-9, the electrode retainers 130 provide a modular, systematic, way to install electrodes 140, separators 160, electrolyte, and current collector (not shown in figures) 170 in the energy storage container 100. The energy storage container 100 may be used with both cathode and anode retainers 130, only one type of electrode retainers 130, or without any retainers at all (FIG. 9). The electrode retainers 130 support repair, maintenance, updating, and recycling of old electrodes 140 at their end of life.

In a first embodiment as seen in FIG. 7, the electrode retainer 130 is a perpendicular retainer 130, which is flat, patty-shaped, and may comprise of various thicknesses, typically a diameter to fit inside the cylindrical housing 110 in stacked format. Then perpendicular retainer 130 comprises an internal slip fit retainer element 132 comprising a plurality of corrugation holes 133 to allow electrolyte circulation; and an external slip fit retainer element 134 comprising a plurality of corrugation holes 135 to allow electrolyte circulation. An internal cavity 136 is defined between the internal slip fit retainer element 132 and the external slip fit retainer element 134 to support the installation of at least one electrode 140. In other words, the perpendicular retainer 130 will have an internal cavity 136 to support the installation of electrode material 140, and the perpendicular retainer 130 may have corrugation holes (133, 135) to allow electrolyte to circulate for chemical reactions, ions to shuttle between electrodes 130, and to allow cooling features. The perpendicular retainer 130 may be sealed and operate at a different pressure or vacuum from the cylindrical housing 110. The perpendicular retainer 130 may be conductive to allow current and electrons to flow to the cylindrical housing 110 when a decrease in electrical resistance is required. In an embodiment, the perpendicular retainer 130 may be constructed of a non-conductive material to act as a separator/insulator for the neighboring electrode retainer 130, cylindrical housing 110, end cap 120, or diaphragm (membrane) 116. The electrode material 140 may have several forms such as but not limited to: jelly-roll, stacked wafers, perpendicular thin-film electrodes, wafer electrodes, and disk-shaped electrodes. or free electrodes of a certain bulk media. In an embodiment, at least one electrode separator 160 is arranged between at least a pair of electrodes 140. As seen in FIG. 7, the pair of electrodes 140 are arranged parallel to each other. As seen in FIG. 7, the perpendicular retainer 130 is perpendicular to the longitudinal axis of the cylindrical housing 110. The perpendicular retainer 130 will be of various thicknesses to account for stacked cell layers and voltages for efficient interaction of active electrode materials 140 with electrolyte and with the opposing perpendicular retainer 130. In an embodiment, the perpendicular retainer 130 will act as a separator for electrode material 140 of the neighboring electrode retainer. In an embodiment, single perpendicular retainer 130 can house anode 140 or cathode 140 separately and the perpendicular retainer 130 are staggered/alternated for efficient electrochemical reactions. In another embodiment, anode and cathode materials may both be present in a single perpendicular retainer 130, and this will necessitate inter-retainer electrode separators 160. Another positive design aspect of the perpendicular retainer 130 is that the perpendicular retainer 130 keeps the electrode 140 from coming into contact (electrical insulation) with the cylindrical housing 110 in the case of metallic cylindrical housing 110. The perpendicular retainer 130 will also have sleeve-fit features to account for expansion and contraction of electrode 140 while allowing the end cap 120 fastening method to provide clamping force to the retainer stack (FIG. 7). The diaphragm (membrane) 116 installed between each end cap 120 and cylindrical housing 110, with an appropriately controlled primary/secondary expansion arca, can also provide the clamping force required for the slip-fit feature to adjust with the expansion/contraction of each perpendicular retainer 130.

In a second embodiment as seen in FIG. 8, the electrode retainer 130 is a longitudinal retainer 230 (hotdog). The longitudinal retainer 230 comprises a plurality of tubes 232 arranged substantially parallel to each other; wherein the plurality of tubes 232 are spaced from each other.

A cathode 140 is arranged in at least one tube selected from the plurality of tubes 232 and an anode 140 is arranged in at least one tube selected from the plurality of tubes 232. At least one fluid flow is arranged in a space 234 formed between the plurality of tubes 232, wherein the fluid comprises at least one of: a coolant and/or an electrolyte. The plurality of tubes 232 are interconnected to form a substantially cylindrical shape. The shapes of the longitudinal retainer 230 can be in form of tubes, rods, flat plate, annular, or boxes. The longitudinal retainer 230 can accept free electrodes 140 (bulk materials) or attached electrodes 140 of a specific design. An emphasis of the large-format battery will be on producing less expensive, rapidly produced electrode material 140 for speed and scale of manufacturing and adoption. The accuracy of film thickness may be reduced, but cost will come down and production rates can increase. This is an acceptable trade off because energy density is not a primary requirement of large-format stationary batteries. One such configuration could include several bulkhead-type retainer/separator/current collector (not shown in figures) coupled with multiple longitudinal electrode tubes 232 (FIG. 8), shafts, rods, or other suitable shapes arranged lengthwise in the cylindrical housing 110. In various embodiments (not shown in figures), the cathode 140 and/or anode 140 are formed of a shape comprising of: a square tube, a cylindrical rod, a hexagonal shaft, a rectangle pipe, and an oval pipe.

In an embodiment, the longitudinal retainer 230 can accept free electrodes 140 of any shape, individual rods of one type of electrode 140, or electrode rods to include both anode and cathode with the appropriate separators 160 and collectors, or hotdog/hamburger battery configuration of long tubes with wafer cathode 140 and anodes 140 internal to the longitudinal retainer 230. The cap fittings on the ends of the electrode 140 tubes telescope to allow the primary and secondary expansion diaphragm (membrane) 116 to physically push the electrode material 140 together as temperatures and pressures change inside the energy storage container 100 with expansion and contraction associated with charge state. The tubes 232 leave space at their tangents for cooling passages to be distributed lengthwise, or for coolant to pass through the natural gap created at the tangent of each tube 232.

In another embodiment (not shown in figures), the longitudinal retainer 230 is in form of a flat plate or box. The flat plate longitudinal retainer 230 can accept free electrodes, or flat stacked electrode material of one type inside the Flat plate longitudinal retainer 230, or a combination of flat stacked cathode film 140 and anode film 140 in one Flat plate longitudinal retainer 230 with the appropriate spacers and current collector (not shown in figures). This design is efficient when considering electrode material 140 density and the volume it takes up inside the Flat plate longitudinal retainer 230 and makes use of existing film electrode manufacturing techniques. This could be a very long prismatic or pouch cell.

In another embodiment (not shown in figures), the longitudinal retainer 230 has annular shape. The annular shape longitudinal retainer 230, just like the rings of a tree, can accept free electrodes 140 of various sizes with an integral current collector (not shown in figures) to the longitudinal retainer 230, in alternating rings or wrapped electrode 140 of one type inside of each annular ring also with an integral current collector (not shown in figures).

The plurality of tubes 232 could comprise longitudinal pipes, square tubes, rods, or other shaped tubes parallel to the main longitudinal axis of the energy storage container 100. The longitudinal retainer 230 may be perforated/corrugated tubes providing a cavity for electrode materials 140 to be installed in jelly roll, wafer, or bulk material format. The longitudinal retainer 230 may be sealed and operate at a different pressure or vacuum from the cylindrical housing 110. In an embodiment, the longitudinal retainer 230 act as a separator between electrodes 140 and provide a mechanism for attaching current collector (not shown in figures).

The electrode retainer (130, 230) provides flexibility for more effective thermal runaway mitigation and more effective thermal runaway shutdown by isolating part of the chemistry in the electrode retainer (130, 230), or isolating the entire electrode retainer (130, 230), the updating/replacement of battery components/materials, and/or the possibility of recycling battery components/materials too. The interchangeable and interoperable features of the electrode retainer (130, 230) will allow the cylindrical housing 140 to be updated with existing and future chemistry or battery systems. This is an enabling feature in reducing energy storage costs, depending on the frequency of chemistry components replacement over the lifetime usage of the cylindrical housing 140. By reusing the cylindrical housing 140 and electrode retainers (130, 230) and updating them with more affordable chemistry and battery systems that will be developed in the future. Electrode material 140 inside the electrode retainers (130, 230) can be arranged in series and/or parallel and supports architecture of bipolar electrodes 140 for different desired voltages and currents. A key method and embodiment allowed with the cylindrical housing 140 is thermal management of the cylindrical housing 140 by simultaneously charging and discharging certain electrode retainers (130, 230), cells, or portion of the battery during high charge rate, high ambient and internal temperatures. Both the charge and discharge cycle will create heat related to the internal electrical resistance of the cell, however, a charge related electrochemical reaction will typically be exothermic, while a discharge reaction will be endothermic. The battery management system (BMS) will manage electrode retainers (130, 230) and cells in proximity of an overheating retainer/cell, and installed chemistry, to discharge and absorb the heat of the overheating electrode retainer (130, 230) with thermodynamics of the discharge reaction.

The electrode retainers (130, 230) simply represent a few configurations that battery engineers and chemists can use to insert proprietary battery chemistry of cathodes, anodes, electrolytes, etc. while using existing industry electrode manufacturing processes, tooling, etc. The electrode retainers (130, 230) may be configured in lateral (hamburger) style (FIG. 7), or longitudinal (hotdog) style (FIG. 8). Inside of both styles of electrode retainers (130, 230) the electrodes 140 may be attached, wherein the current collector (not shown in figures) attach to each electrode 140 individually and provide a path for electrons or free electrodes, where electrons find a conductive path through the proximity of nearby electrode 140 (bulk material: i.e., spheres, tubes, pellets, or combinations of formats, etc.) then to a common collector(s) in the electrode retainers (130, 230). It is up to the battery designer to size the cathode (electrode 140) electrode retainers (130, 230) and cathodes (electrode 140) appropriately to the anode (electrode 140) electrode retainers (130, 230) and anodes (electrode 140) for optimum cathode-to-anode ratio.

In another embodiment as seen in FIG. 15, a modified electrode retainer 230' is shown, according to another embodiment of the present invention. The modified electrode retainer 230' is quite similar to the electrode retainer 230 of FIG. 8, except few geometrical modifications. The modified electrode retainer 230' comprises a plurality of cells 140 (electrodes 140) arranged in a circular pattern. As seen in FIG. 15, the plurality of cells 140 (electrodes 140) are arranged in parallel manner such that few cells 140 (electrodes 140) selected from the plurality of cells 140 are arranged together to define an upper circular pattern, and remaining cells 140 (electrodes 140) selected from the plurality of cells 140 are arranged together to define a lower circular pattern. A plurality of clamping plates 236 are arranged at both ends of the plurality of cells 140 (electrodes 140). The plurality of clamping plates 236 physically separates the few cells 140 (electrodes 140) arranged together in the upper circular pattern from the remaining cells 140 (electrodes 140) arranged together in the lower circular pattern. At least one fluid flow is arranged in a space 234 formed between the plurality of cells 140 (electrodes 140), wherein the fluid comprises a coolant that is comprised of at least one of a liquid and/or gas.

The overall concept of the energy storage container is to offer the battery development community a known platform for energy storage container design, manufacture, and production. The pre-designed longitudinal retainer and perpendicular retainer offerings facilitate designers to focus on proprietary specific battery chemistry and not on the container. Yet, customers may determine their battery chemistry perform best (all factors considered) without utilizing one of these pre-determined retainer options. Not using a retainer offers the benefits of a lower parts count thereby lowering complexity and production costs, and time to manufacture. It should be emphasized that the energy storage container is optimized for large-format, long-duration, electrochemical storage, so it could be fitting that the internal battery chemistry were manufactured and produced with true utility-scale methods as well; not the precision laboratory production environment of current electric car and device small-format Li-ion cells.

Referring to FIG. 9, the cylindrical housing 110 can be designed to operate with or without the use of any electrode retainers. In an embodiment as seen in FIG. 9, a retainer-less design is accomplished using jelly roll design electrodes 140. The idea of the jelly roll design electrodes 140 is to manufacture a large-format, long-duration energy storage battery at industrial-scale with the lowest manufacturing cost, assembly costs, and maintenance costs etc. As seen in FIG. 9, the jelly roll design electrodes 140 can be continuous the entire length of the cylindrical housing 140 or, segmented jelly roll electrodes 140 with separators 160 to arrange the current collector (not shown in figures) for the desired voltage and current output. The emphasis here could be on rolling up easy/affordable to manufacture electrodes 140 and separators 160 that are no more complicated than expanded metal sheets, foils, films, etc., except for altering the fill density of the media. Retainer-less jelly electrodes 140 could be wired to current collector (not shown in figures) to include series/parallel, or both simultaneously for desired voltage/current output.

In an embodiment (not shown in figures), a retainer-less design is accomplished using perpendicular thin-film electrodes 140 or thick wafer electrodes 140 and solid/liquid electrolyte and separators. A lining (not shown in figures) of the cylindrical housing 110 is configured to electrically insulate the cylindrical housing 110 from the electrodes 140. Emphasis could be easy/affordable to manufacture extruded graphite or drawn crystal electrodes 140 that are sliced perpendicular patties or wafers.

It should be understood that the term "electrodes 140" include at least one of: a cathode and an anode. The electrodes 140 could have various types and sizes. For instance, Free electrodes 140 are installed inside the electrode retainer (130, 230) where electrons find a conductive path through the proximity of similar free electrodes to a common collector(s) (not shown in figures) in the electrode retainer (130, 230). Free electrodes 140 can be a bulk-material (medium) of spheres, cylinders, pellets, or random material shapes coated in anode and cathode material. The shapes used for Free electrodes 140 can be used similarly in both types of electrode retainers (130, 230). In the case of free electrodes 140, the electrode retainers (130, 230) may be thinner to promote chemical reactions on both sides of the electrode retainers (130, 230), with the free electrodes 140 in the middle of the electrode retainers (130, 230) also contributing to the reaction. It is understood that free electrodes 140 may have an increased internal battery resistance to attached electrode style, the positive tradeoff is case and cost of manufacturing the free electrodes 140, assembling free electrodes 140 into electrode retainers (130, 230), and end-of-life recyclability and interchangeability of new battery chemistry elements into existing electrode retainers (130, 230) and energy storage container 100.

In another embodiment, the electrodes 140 could be in form of attached electrodes 140 140 wherein attached electrodes 140 includes current collector (not shown in figures) (not shown in figures) attached to each electrode element

140 individually (typical for the industry) and providing a path for electrons to flow. The attached electrodes 140 can be used in both types of electrode retainers (130, 230). The attached electrodes 140 offer the benefit of decreased internal resistance and increased conductivity with limited increase in design complexity (design for manufacture) and cost of manufacture.

With the use of both types of electrode retainers (130, 230), with free or attached electrodes 140 inside, a current collector (not shown in figures) establishes a path for electrons to be collected from each electrode retainer (130, 230) and then exit and enter the energy storage container 100. A current collector (not shown in figures) conducts the flow of electrons between the active materials of the electrodes 140 and the battery terminals. Current collectors (not shown in figures) may be arranged in series and/or parallel, or bipolar configuration to account for desired output voltage and in the form of wires, flat metal sheets, or other conductive materials to collect current from each electrode retainer. The design and configuration of the current collector (not shown in figures) should decrease internal resistance of the battery for efficient charge and discharge rate. In an alternate current collector (not shown in figures) configuration, to further reduce parts count and installations inside the cylindrical housing 110, the anode or cathode current collector (not shown in figures) may be electrically continuous to the electrode retainer (130, 230), and the electrode retainer (130, 230) is electrically continuous with the electrically conductive container. The electrical resistance could be low, and contact could be suitable to handle the desired current flow. In addition, the opposite electrode retainer (130, 230) and current collector (not shown in figures) could need to be electrically insulated from the cylindrical housing 110.

Various current collector (not shown in figures) system designs could permit users to arrange and assemble the internal cells/electrode retainers (130, 230) in different configurations to achieve different voltages and currents. This is a useful feature as it can be fully customizable for a wide range of applications. Batteries, capacitors, and fuel cells can be within the same container to provide hybrid performance. Each cylindrical housing 110 and electrode retainer (130, 230) design could have a related current collector (not shown in figures) system.

Exchangeable electrodes 140/electrode retainers (130, 230) can "refresh" the battery as battery chemistry progresses in the future, which is another compelling design feature. In comparison to what exists, such as the Tesla Powerwall, Powerpack and Megapack, which do not have this feature, the present invention could offer a huge competitive advantage as an environmentally friendly energy storage device. It is estimated that the present invention, with a properly matched chemistry system, will offer as much as a 90% cost savings over the life-cycle of the battery considering total power stored and power sent back out to the grid. The energy storage container 100 and electrode retainers (130, 230) and can be updated and is reusable/recyclable. The electrode retainers (130, 230) will also be reusable/recyclable. As battery chemistry changes over time and in-situ chemistry wear out, new battery chemistry systems can be installed in the existing energy storage container 100 enabling compelling and unrealized power and energy density increases.

In an embodiment of the present invention, there may be passive cooling. Longitude or radial protruding fins (not shown in figures) made of a thermal conductive material allow heat to leave the energy storage container 100 via radiative and conductive cooling. It may be integrated to the cylindrical housing 110 and end cap 120 during the manufacturing process. Or a separate component can be attached to the energy storage container 100, via bonding, welding, or mechanical such as fasteners, or clamped, it can also be installed/removed when specific cooling properties are desired. A way to cool an energy storage container above ground 100, regardless of internal battery chemistry, is through passive cooling involving a mass heat sink (not shown in figures) with radiation and conductive cooling fins (not shown in figures). The fins (not shown in figures) could be arranged longitudinally along the energy storage container 100 or radially around the circumference of the energy storage container 100. For increased passive cooling, the end cap 120 could have linear fins, or annular fins. A way to cool an energy storage container underground, regardless of internal battery chemistry, would involve engineered earthwork and packed materials such as dirt, sand, gravel stone, concrete, or other aggregate to support the container while thermally conducting heat away from the outside of the container to the surrounding underground area.

In certain applications, a battery management system (BMS) control chargers, invertors, fans or pumps to increase air/liquid flow over the battery, and heat exchangers, to mitigate the onset of thermal runaway conditions. The battery management system (BMS) can make changes to pressure and charge/discharge rates of certain retainers/cells to aid in thermal management. The BESS components may be contained in the same container or separated container.

In another embodiment of the present invention such as flow batteries (not shown in figures), there may be active internal cooling. In this embodiment (not shown in figures), there may be open-loop active cooling such that an electrolyte is pumped to an external, cooling unit (not shown in figures), heat exchanger or other radiative cooling mechanism (not shown in figures) to transfer heat out of the electrolyte and away from the internal energy storage container assembly. In closed-loop active cooling, internal channels, pipes, plumbing are installed to allow a separate cooling fluid to be circulated to the internal portion of the battery and not mix with battery chemistries. Heat is transferred from the battery to the cooling fluid, and then routed to an external cooling unit, heat exchangers, or radiative cooling mechanism to transfer the heat to the atmosphere. Adding a cooling fluid introduces complexity, and using the electrolyte allows more to be present, and circulated offering ion transfer benefits similar to flow batteries.

Various techniques/methods (not shown in figures) for active cooling according to various embodiments of the present invention are:

1. Air Jacket (double wall cylinder)—With all passive components installed, a double wall around the energy storage container, with ducts to force cooling air through the cowling and across the radiant fins, may be implemented. The heated air, in this case, will be exhausted to the environment.

2. Liquid cooling—double wall: With all the components of a passive cooling system installed, then the energy storage container has a water-tight double wall installed around the outside. Liquid will be pumped through the double wall area and then onward, in a plumbing circuit, to heat exchanges to dissipate heat. The battery management system (BMS) will control the coolant pumps with inputs from temperature and pressure sensors and relief mechanism.

3. Liquid cooled—Circulate coolant through internal passages: Circulate coolant through internal passages (FIG. 8) with perpendicular or longitudinal electrode retainers, or retainer-less arrangements, then route the fluid to an external heat exchanger to dissipate heat to the atmosphere. Some battery chemistry, with solid electrode and electrolyte for example, may use an isolated fluid, in a closed-loop circuit, to circulate the coolant, while some designs may circulate and cool the electrolyte itself.

With existing and future ambient and non-ambient battery chemistry technologies developments, there will be an ever-increasing demand for thermal management of the energy storage container 100 and its contents for continued and consistent battery performance and perhaps vehicle temperature or passenger comfort too. The ability to thermally regulate a battery will become a limiting factor with specific battery chemistry as charging and discharging cycles are pushed to the extremes for optimum capacity, output and efficiency. Not all battery chemistry installed in the energy storage container 100 will require cooling, some may suffice with no cooling, some may require passive cooling, while others may need active cooling methods, and at the extreme case, passive and active cooling will be needed to keep the battery chemistry operating at the intended temperature range. It should be noted that pressure may be the limiting factor of the battery chemistry and performance, and cooling will thereby reduce the pressure of the energy storage container 100. Insulation and heating of the energy storage container 100 may also assist in maintaining proper temperature at times when a minimum temperature must be maintained for proper battery performance.

In another embodiment of the present invention (not shown in figures), the energy storage container 100 could be thermally controlled using geological thermal management wherein geological thermal management includes burying long-duration energy storage container 100 and BESS components underground: The large-format, vessel style, and long life-cycles are conducive to a claim of burying the energy storage container 100 and associated battery, capacitor, or fuel cell container underground, using passive and active methods from above. This embodiment smooths out the battery thermal management requirements for diurnal, seasonal, solar heating, and radiative/conductive heat gains and losses. The consistent temperature experienced just under the surface of the earth provides a more desirable, stable, environment for consistently regulated electrochemical reactions and capacitor cycles of any long-duration, large-format, grid size energy storage device. In addition, buried underground energy storage container 100 are subject to enhanced security, reduced war or terrorism risk and reduced exposure to natural disasters such as fires or extreme meteorological temperature events.

FIG. 10 illustrates various views of a metal-air battery 200 utilizing energy storage container 100 of FIG. 1. The existing metal-air battery 200 of any variety (Lithium, Sodium, Potassium, Zinc, Magnesium, Calcium, Aluminum, Iron, or other) is an electrochemical cell with a metal anode and an external cathode exposed to ambient air where a reduction reaction occurs. Typically, ambient air passes the cathode and ions transfer to the anode through electrolyte and the cell is not pressurized in any way. The energy storage container 100 offers battery system and battery chemistry interoperability, any existing metal-air chemistry can be configured and installed with both the electrodes 140 being pressurized or just one electrode 140 being pressurized. FIG. 10 illustrates various views of a metal-air battery 200 wherein the metal anode 140 of a metal air cell 142, electrolyte, separators 160 (not shown in figures), oxygen cylinder 250, oxygen manifold 260 and cathode 160 (catalyst layer, current collector (not shown in figures), and gas diffusion layer) are all integrated in the energy storage container 100 with all the pressure control, safety mechanism, electrode expansion/contraction, clamping force, and temperature control for normal film-type batteries in primary and secondary formats. Pressure control, clamping force and temperature control both offer positive benefits for ionic conductivity, improved cycle life and aid the catalysts in discharge and charge chemical reactions. Pressure control, clamping force and temperature control can be used to prevent corrosion of the metal anode 140 via dendrite formation, which are known to lead to battery failure from the formation of an electrical short across the electrodes 140. Pressure control, clamping force and temperature control may also stabilize important intermediate species that play a crucial role in the lifecycle of metal-air battery 200. For example, an important byproduct of Li-air batteries 200 is lithium superoxide, a compound formed during battery cell cycling, which is known to react to form lithium peroxide. Lithium peroxide is known as a key to battery storage. A gaseous electrolyte improves the ion diffusion rate, which represents another prominent limitation to the metal-air battery current state of the art. Additionally, the electrode retainer (130, 230) can be used to install cathodes 140 and anodes 140 just like any other iteration of energy storage container 100 with battery chemistry installed. A distinct advantage of the pressurized environment is it provides the use of pure $O_2$ or liquid $O_2$ 250 for the oxidation reaction, thereby significantly improving the capacity, energy density, and power density compared to a typical ambient metal-air configured battery. Pure $O_2$ or liquid $O_2$ can be provided in the system, thereby overcoming variable performance associated with ambient air oxygen concentration differences to provide consistent performance across a multitude of different environmental conditions. The closed-loop nature of the energy storage container 100 prevents environmental contamination of the electrodes 140 and diaphragm (membrane) 116, as well as minimizes the negative effects of introducing moisture or other contaminants into the system. $O_2$ filters can also be implemented to improve the quality of the O2 supplied as an alternative to the closed loop system, as well as being utilized to refuel the pure $O_2$ reserves.

FIG. 11 illustrates various views of a Flow Battery 300 utilizing energy storage container 100 of FIG. 1. An existing flow battery 300 of any variety (inorganic, organic, etc.) is an electrochemical cell with two tanks of liquids at ambient pressure, where the liquid is pumped past two electrodes and ions pass through a selective membrane. Because the energy storage container 100 offers battery system and battery chemistry interoperability, any existing flow battery chemistry can be configured and installed with both the anolyte and catholyte tanks being pressurized, or just one. FIG. 11 illustrates various views of a Flow Battery 300 wherein the anolyte tank 350, catholyte tank 360, a cathode flow cell 380, an anode flow cell 390, current collector (not shown in figures), and ion-selective membrane are all pressurized in several container manifolds 370, or a single integrated manifold with flow and pressure control. Safety mechanisms are integrated to prevent corrosive and toxic chemicals from contaminating the surrounding environment. A membrane manifold with expansion/contraction clamping force capabilities allows for different pressures and flow rates within the diaphragm (membrane). The tanks can support one cell, or any number of (n) cells, in separate containers or an integrated container. Additionally, the electrode retainer (130, 230) can be used to install any or many catholyte or anolyte active materials. A distinct advantage of the pressurized environment is the ability to pressurize the liquid and/or gas electrolytes to achieve different flow rates, manifold pressures, and temperature conditions thereby, significantly improving the capabilities, capacity, and cycle life of the system. Pressure control, clamping force and temperature control offer a distinct advantage with current collector (not shown in figures), electrodes 140, and for the replacement of expensive fluids that are also corrosive or toxic. For example, liquefied gases may be substituted for traditional liquids, providing similar or enhanced performance at lower cost and/or with little to no corrosion or toxicity concern.

FIG. 12 illustrates various views of a Capacitor 400 and supercapacitor stack 410 utilizing energy storage container 100 of FIG. 1. Existing capacitors 400 (fixed, variable, polarized and non-polarized) of any variety is a device that stores energy in an electrical field consisting of metal plates and a dielectric separating them. Ultra-capacitors 400 (double-layer-electric double-layer capacitor, EDLC, or ultra-capacitor; pseudo capacitor; or hybrid) store electrical energy between the surface of two electrode layers that hold an electrical potential. Because energy storage container 100 offers capacitor system and capacitor components interoperability, any existing capacitor 400 can be configured and installed in the energy storage container 100 with a vacuum or pressure to meet design requirements. FIG. 12 illustrates various views of a Capacitor 400 and supercapacitor stack 410 where the conductors (graphite, carbon, and metal) and dielectrics (polymer separators, air, oil and glass) are all pressurized in several cylindrical housing 110 in a bank, or a single integrated cylindrical housing 110 with pressure control, safety mechanisms, cell expansion/contraction, and clamping force for normal cylindrical housing 110 in place. The cylindrical housing 110 can support one capacitor 400, or any number of (n) capacitors 400, in separate cylindrical housing 110 or an integrated cylindrical housing 110. The cylindrical housing 110 of the capacitor 400 can be arranged in series, parallel, or a hybrid combination to achieve different current discharges and electric potentials. Additionally, electrode retainer (130, 230) may be used to install capacitor 400 just like any other iteration of cylindrical housing 110 with battery chemistry installed. A distinct advantage of the cylindrical housing 110 of the capacitor 400 is the ability to add pressure/vacuum, clamping pressure and cell expansion/contraction to the liquid/gas/solid dialectic and plate/electrode materials that generate the electric field, thereby, significantly improving grid capacitors 400 for energy storage, power conditioning, and power-factor correction. Applying pressure/vacuum, clamping force, and cell expansion/contraction to a capacitor 400 or ultra-capacitor 400 with the energy storage container 100 improves coulombic efficiency, dielectric strength, breakdown voltage, energy capacity, Q factor, power density, cycle life, leakage, and capacitance instability of typical ambient and vacuum capacitors 400. Ultra-capacitors 400 known in the state of the art are currently limited in storage capacity by the electrochemical performance of current electrolyte and active materials of electrode 140. Ultra-capacitor 400 energy densities can be enhanced by increasing the effective surface area of electrode materials 140 in double layer capacitors 400 and/or by increasing the operation voltage window. Pressure control, clamping force and temperature control can increase electrolyte stability permitting longer operation at higher voltages, providing higher energy density, up to and exceeding batteries. Ultra-capacitor 400 operation at higher voltage can decrease the number of serial connections, decreasing the need for high current charging and discharging in applications and reducing overcharging, leading to much longer device lifetimes.

FIG. 13 illustrates various views of a Fuel Cell Container 500 utilizing energy storage container 100 of FIG. 1. Existing Fuel Cell Container 500 (polymer electrolyte membrane or PEM, Alkaline or AFC, Phosphoric acid or PAFC, Molten carbonate or MCFC, Solid oxide or SOFC) provide electrical energy if fuel (typically hydrogen) is provided. By definition, a Fuel Cell Container 500 is not a battery, yet the typical types of Fuel Cell Container 500 could benefit from having one electrode (anode or cathode) or both electrodes (anode and cathode) of the Fuel Cell Container 500 system pressurized for increased efficiency of the electrochemical reactions of hydrogen fuel and oxygen. FIG. 13 illustrates various views of a Fuel Cell Container 500 that includes oxygen tank 550, a fuel cell 560, a hydrogen tank 570 and multiple manifold lines 580. The Fuel Cell Container 500 will provide pressurization aspects, safety systems incorporation and improvement of all basic chemical pathways that the energy storage container 100 installed offers. With an enclosed and pressurized environment for Fuel Cell Container 500 reactions, excess hydrogen can be more fully utilized as the protons cross the proton exchange membrane and electrons travel to the cathode through the external circuit providing the load. With a pressurized cathode 140 the frequency of the interaction of protons and oxygen increases, leading to more reactions and improved device fuel use efficiency. Pressurizing the cathode 140 with filtered compressed air, or pure $O_2$ offers improvement on Fuel Cell Container 500 performance. Container environment control also minimizes moisture and other contamination, which prevents cathode 140 degradation and side reactions. With a fully pressurized system, hydrogen can be consumed completely. Pressurized air or pure $O_2$ (gas or liquid) will fully oxidize hydrogen to produce water that exits though a water exhaust 562 in the presence of protons. Some of the water produced at the cathode can be drained or retained inside the cylindrical housing 110 to control humidity. Because the Fuel Cell Container 500 electrochemical reaction is exothermic there is a cogeneration opportunity to harvest the heat for thermal energy applications.

FIG. 14 illustrates various views of a reversible fuel cell 600 utilizing energy storage container 100 of FIG. 1. Regenerative or reversible fuel cell container 600 (RFC) performs like other electrochemical energy storage devices, for example, large-format and long-duration batteries. Because energy storage container 100 offers a fuel cell system and fuel cell chemistry interoperability, any existing reversible fuel cell 600 can be configured and installed in the energy storage container 100 with a vacuum or pressure for the necessary design requirements. FIG. 14 illustrates a unitized regenerative/reversible fuel cell 600 (URFC) that includes oxygen tank 650, a hydrogen tank 670 and multiple manifold lines 680. Further, a refueling manifold 690 and hydrolysis chamber 692 is provided. where the chemistry is all pressurized in several energy storage container 100 or stacks, or a single integrated energy storage container 100 with all the pressure control and safety mechanism, cell expansion/contraction, and clamping force for normal battery-type containers in place. The URFC 600 performs electrolysis as an electrolyzer, with the bidirectional function of reverse electrolysis. The cogeneration of heat as a byproduct of the exothermic reaction of hydrogen oxidizing with the $O_2$ can be used to reverse the electrolysis process, turning water into steam. Any efficiency losses can be overcome with electrical "charging" to decomposition and overpotential voltage of the URFC 600 with an outside electrical source. The energy storage container 100 can support one URFC 600, or any number of (n) URFC 600, in separate energy storage container 100 or integrated stacks. The fuel cell stacks and containers can be arranged in series, parallel or series-parallel for desired voltage or current output. Additionally, electrode retainer (130, 230) may be used as a systematic way to install different fuel cell catalysts, PEM, fuel materials just like any other iteration of energy storage container with battery chemistry installed. A distinct advantage of the internal environment of the fuel cell and stacks is the ability to add a pressurize/vacuum to the liquid/gas/solid and electrode materials 140 that generate the electron flow and proton exchange, thereby, significantly improving the RFC 600 for energy storage. Applying a positive pressure or vacuum to a fuel cell or regenerative fuel cell 600 with the energy storage container 100 addresses the disadvantages of traditional fuel cells by improving round-trip coulombic efficiency, energy and power capacity. An ability to reuse system hydrogen and oxygen, provided by recharging the fuel with excess thermal energy and excess grid energy through electrolysis, creates a renewable energy storage supply. Reusing hydrogen eliminates fueling requirements and the associated hazards. The closed-loop nature of the URFC 600 also eliminates the need to generate more, new hydrogen, to use as fuel.

In various embodiments (not shown in figures), the energy storage container 100, metal-air battery 200, flow battery 300, capacitor 400, fuel cell container 500 and reversible fuel cell 600 will have the appropriate electrical connectors, sensor, and component mounts to support BMS (battery management system) and SCADA (Supervisory Control and Data Acquisition) operations and functionally. Other remote sensing, battery management, remote control, and automatic functions of the battery may be conducted through the connections and mounting locations.

In various embodiments (not shown in figures), the energy storage container 100, metal-air battery 200, flow battery 300, capacitor 400, fuel cell container 500 and reversible fuel cell 600 will have the appropriate electrical connection points for DC-AC inverters, DC-DC converters, and other ways to connect to the transmission grid, distribution grids, micro-grids, legacy generation plants, hydrogen production facilities, and renewable generation plants also. The connection point provided shall not be limited to connecting to only the facilities and devices described above, but also, additional load and generation devices.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

The various components, and parts of the various embodiments of the energy storage container 100, metal-air battery 200, flow battery 300, capacitor 400, fuel cell container 500, and reversible fuel cell 600 of the present invention are similar and interchangeable. It is obvious to the one skilled in the art that the various components, parts of the energy storage container 100 of the present invention could be considered for metal-air battery 200, flow battery 300, capacitor 400, fuel cell container 500 and reversible fuel cell 600 with little or no variation.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

Clause 1. An energy storage container comprising: a cylindrical housing configured for enclosing electrodes and storing electrolyte at pressure above ambient pressure or below ambient pressure; wherein the cylindrical housing comprises two opposite ends spaced from each other; a pair of end caps disposed on opposite ends of the cylindrical housing, wherein the pair of end caps are configured to seal the opposite ends of the cylindrical housing; wherein each end cap selected from the pair of end caps comprises a pressure relief valve; and a diaphragm positioned between each end cap selected from the pair of end caps and a corresponding end of the cylindrical housing.

Clause 2. The energy storage container according to clause 1, wherein each end cap selected from the pair of end caps comprises a flange; and each end selected from the two opposite ends of the cylindrical housing comprises an opposite flange.

Clause 3. The energy storage container according to clause 1, wherein each end cap selected from the pair of end caps comprises a pressure port that is configured to introduce fluid or gas in the corresponding end cap.

Clause 4. The energy storage container according to clause 1, wherein the energy storage container is configured to be installed below ground surface for geological thermal management of the energy storage container.

Clause 5. The energy storage container according to clause 1, wherein the energy storage container is configured for use in at least one of electrochemical battery cells, Li-ion batteries, intercalation batteries, metal-air batteries, flow batteries, fuel cells, reversible fuel cells, and capacitors.

Clause 6. The energy storage container according to clause 1, wherein each end cap selected from the pair of end caps is fixedly connected to the corresponding end of the cylindrical housing.

Clause 7. The energy storage container according to clause 1, wherein each end cap selected from the pair of end caps is removably connected to the corresponding end of the cylindrical housing.

Clause 8. The energy storage container according to clause 1, wherein each end cap selected from the pair of end caps comprises a pressure relief valve, and a set pressure of the pressure relief valve of each end cap selected from the pair of end caps is measurably distinct from one another.

Clause 9. The energy storage container according to clause 1, wherein each end cap selected from the pair of end caps comprises a pressure relief valve, and a set pressure of the pressure relief valve of each end cap selected from the pair of end caps is measurably same.

Clause 10. An over-pressure fail-safe mechanism and chemical retention method for an energy storage container comprising: a pressure relief valve arranged in the container; an envelope or receptacle connected downstream to the pressure relief valve; wherein the envelope or receptacle is configured to be filled with liquid/gas contents of the energy storage container; wherein the over-pressure fail-safe mechanism is configured to be activated in either a first mode or a second mode depending on the pressure of the contents in the container; wherein in the first mode, the pressure relief valve releases at least some contents of the container in the envelope or receptacle; wherein in the second mode, the envelope or receptacle releases a metered quantity of at least some contents of the envelop or receptacle in an atmosphere to prevent a rupture or failure of the envelope or receptacle; and wherein the second mode is activated only after activation of the first mode when the pressure of the released contents in the envelope or receptacle exceeds a third set pressure.

Clause 11. The over-pressure fail-safe mechanism according to clause 10, wherein the over-pressure fail-safe mechanism is automatically activated only when the pressure of the contents in the container exceeds a second set pressure.

Clause 12. The over-pressure fail-safe mechanism according to clause 10, wherein the envelope further comprises a pressure relief valve that is configured to release a metered quantity of at least some contents of the container in the atmosphere when the pressure of the released contents in the envelope exceeds a third set pressure.

Clause 13. An electrode retainer comprising: an internal slip fit retainer element comprising a plurality of corrugation holes to allow electrolyte circulation; an external slip fit retainer element comprising a plurality of corrugation holes to allow electrolyte circulation; and an internal cavity is defined between the internal slip fit retainer element and the external slip fit retainer element to support an installation of at least one electrode.

Clause 14. The electrode retainer according to clause 13, wherein at least one electrode separator is arranged between at least a pair of electrodes.

Clause 15. The electrode retainer according to clause 13, wherein at least a pair of electrodes is selected from a group comprising: cylindrical cells, pouch cells, perpendicular thin-film electrodes, wafer electrodes, and disk-shaped electrodes.

Clause 16. The electrode retainer according to clause 13, wherein the electrodes selected from at least a pair of electrodes are arranged parallel to each other.

Clause 17. An electrode retainer comprising: a plurality of tubes arranged substantially parallel to each other; wherein the plurality of tubes are spaced from each other; a cathode arranged in at least one tube selected from the plurality of tubes; and an anode arranged in at least one tube selected from the plurality of tubes; and at least one fluid flow arranged in a space formed between the plurality of tubes; wherein the fluid flow comprises at least one of: a coolant and/or an electrolyte.

Clause 18. The electrode retainer according to clause 17, wherein the plurality of tubes are interconnected to form a substantially cylindrical shape.

Clause 19. The electrode retainer according to clause 17, wherein the cathode and/or anode are formed of a shape comprising of: a square tube, a cylindrical rod, a hexagonal shaft, a rectangle pipe, and an oval pipe, and are capable of housing jellyroll electrodes, stacked wafers, cells, or other electrodes.

Clause 20. An energy storage container comprising: a cylindrical housing configured for enclosing electrodes and storing electrolyte at pressure above or below ambient pressure; wherein the cylindrical housing comprises two opposite ends spaced from each other; a pair of end caps disposed on opposite ends of the cylindrical housing, wherein the pair of end caps are configured to seal the opposite ends of the cylindrical housing; wherein each end cap selected from the pair of end caps comprises a pressure relief valve; a diaphragm positioned between each end cap selected from the pair of end caps and a corresponding end of the cylindrical housing; and wherein the energy storage container is configured to be installed above or below a ground surface for geological thermal management of the energy storage container.

Clause 21. The energy storage container according to clause 20, wherein each end cap selected from the pair of end caps comprises a flange; and each end selected from the two opposite ends of the cylindrical housing comprises an opposite flange.

Clause 22. The energy storage container according to clause 20, wherein each end cap selected from the pair of end caps comprises a pressure port that is configured to introduce fluid in the corresponding end cap.

Clause 23. The energy storage container according to clause 20, wherein the energy storage container is configured to be installed below ground surface for geological thermal management of the energy storage container.

Clause 24. The energy storage container according to clause 20, wherein the energy storage container is configured for use in electrochemical battery cells, Li-ion batteries, intercalation batteries, metal-air batteries, flow batteries, fuel cells, reversible fuel cells, and capacitors.

Clause 25. The energy storage container according to clause 20, wherein each end cap selected from the pair of end caps is fixedly connected to the corresponding end of the cylindrical housing.

Clause 26. The energy storage container according to clause 20, wherein each end cap selected from the pair of end caps is removably connected to the corresponding end of the cylindrical housing.

Clause 27. The energy storage container according to clause 20, wherein each end cap selected from the pair of end caps comprises a pressure relief valve, and a set pressure of the pressure relief valve of each end cap selected from the pair of end caps is measurably distinct from one another.

Clause 28. The energy storage container according to clause 20, wherein each end cap selected from the pair of end caps comprises a pressure relief valve, and a set pressure of the pressure relief valve of each end cap selected from the pair of end caps is measurably same.

What is claimed is:

1. A system comprising:

at least one conductive retainer having a first side and a second side;

a first plurality of parallel arranged electrochemical cells on the first side; and a second plurality of parallel arranged electrochemical cells on the second side;

wherein the first plurality of parallel arranged electrochemical cells and the second plurality of parallel arranged electrochemical cells are arranged in series;

wherein the electrochemical cells are Li-ion batteries or capacitors;

wherein the system is inside an energy storage container that comprises end caps and a cylindrical housing and wherein each end cap comprises a pressure relief valve; and wherein the energy storage container comprises an over-pressure fail-safe mechanism that comprises a diaphragm positioned between each end cap selected from the pair of end caps and a corresponding end of the cylindrical housing.

2. The system of claim 1, wherein:

the first plurality of parallel arranged electrochemical cells and the second plurality of parallel arranged electrochemical cells are arranged in series with at least one more conductive retainer;

wherein the at least one more conductive retainer has a first side and a second side;

wherein the at least one more conductive retainer has a plurality of parallel arranged electrochemical cells on the first side of the at least one more conductive retainer; and a plurality of parallel arranged electrochemical cells on the second side of the at least one more conductive retainer; and wherein the plurality of parallel arranged electrochemical cells on the first side of the at least one more conductive retainer and the plurality of parallel arranged electrochemical cells on the second side of the at least one more conductive retainer are arranged in series with the first plurality of parallel arranged electrochemical cells and the second plurality of parallel arranged electrochemical cells of the at least one conductive retainer.

3. The system of claim 1, wherein the at least one conductive retainer is disc-shaped.

4. The system of claim 1, wherein the electrochemical cells are Li-ion batteries.

5. The system of claim 4, wherein the Li-ion batteries are cylindrical cells.

6. The system of claim 1, wherein the at least one conductive retainer is electrically connected to the cylindrical housing.

7. The system of claim 1, wherein the over-pressure fail safe mechanism comprises:

a pressure relief valve arranged in the container;

an envelope connected downstream to the pressure relief valve;

wherein the envelope is configured to be filled with contents of the container; wherein the over-pressure fail-safe mechanism is configured to be automatically activated in either a first mode or a second mode depending on a pressure of the contents in the container;

wherein in the first mode, the pressure relief valve releases at least some contents of the container in the envelope;

wherein in the second mode, the envelope releases a metered quantity of at least some contents of the container to an atmosphere; and wherein the second mode is activated only after activation of the first mode when the pressure of the released contents in the envelope exceeds a set pressure.

* * * * *